United States Patent
Eriksson et al.

(10) Patent No.: US 10,178,700 B2
(45) Date of Patent: Jan. 8, 2019

(54) METHOD AND DEVICES FOR SOLVING RESOURCE CONFLICT ISSUES AMONG DYNAMIC TDD CAPABLE UE

(71) Applicant: TELEFONAKTIEBOLAGET L M ERICSSON (PUBL), Stockholm (SE)

(72) Inventors: Erik Eriksson, Linköping (SE); Rui Fan, Beijing (CN); Daniel Larsson, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 38 days.

(21) Appl. No.: 14/910,450

(22) PCT Filed: Aug. 8, 2014

(86) PCT No.: PCT/SE2014/050925
§ 371 (c)(1),
(2) Date: Feb. 5, 2016

(87) PCT Pub. No.: WO2015/020604
PCT Pub. Date: Feb. 12, 2015

(65) Prior Publication Data
US 2016/0183308 A1    Jun. 23, 2016

Related U.S. Application Data

(60) Provisional application No. 61/863,841, filed on Aug. 8, 2013.

(51) Int. Cl.
*H04W 74/08* (2009.01)
*H04L 1/06* (2006.01)
*H04L 1/18* (2006.01)
*H04L 5/00* (2006.01)
(Continued)

(52) U.S. Cl.
CPC .......... *H04W 74/0891* (2013.01); *H04L 1/06* (2013.01); *H04L 1/1812* (2013.01);
(Continued)

(58) Field of Classification Search
CPC ....... H04L 1/06; H04L 1/1812; H04L 1/1854; H04L 1/1864; H04L 1/1896;
(Continued)

(56) References Cited

U.S. PATENT DOCUMENTS

| | | | |
|---|---|---|---|
| 2009/0181661 A1* | 7/2009 | Kitazoe | H04W 48/12 455/418 |
| 2013/0194980 A1 | 8/2013 | Yin et al. | |
| 2014/0086112 A1* | 3/2014 | Stern-Berkowitz | H04W 72/1289 370/280 |

OTHER PUBLICATIONS

International Search Report and Written Opinion dated Oct. 14, 2014, in International Application No. PCT/SE2014/050925, 13 pages.

(Continued)

*Primary Examiner* — Asad M Nawaz
*Assistant Examiner* — Zhaohui Yang
(74) *Attorney, Agent, or Firm* — Patent Portfolio Builders, PLLC

(57) ABSTRACT

A method for a device and a node for preventing data transmission configuration conflict between the device and the node is disclosed. The node transmits a control message which is received by the device. The device determines a first data transmission configuration from the received control message. The device then determines a second data transmission configuration from a candidate set of configurations wherein the candidate set of configurations is associated with the first data transmission configuration. The device then transmits data and wherein the node receives the data in accordance with the second data transmission configuration. A device and node implementing the method is also disclosed.

38 Claims, 24 Drawing Sheets

(51) Int. Cl.
*H04L 5/14* (2006.01)
*H04W 72/04* (2009.01)
*H04W 72/12* (2009.01)

(52) U.S. Cl.
CPC .......... *H04L 1/1854* (2013.01); *H04L 1/1864* (2013.01); *H04L 1/1896* (2013.01); *H04L 5/0053* (2013.01); *H04L 5/0055* (2013.01); *H04L 5/1469* (2013.01); *H04W 72/0446* (2013.01); *H04W 72/121* (2013.01); *H04W 72/1268* (2013.01); *H04W 72/1289* (2013.01); *H04L 5/0044* (2013.01); *H04L 5/0073* (2013.01)

(58) Field of Classification Search
CPC ... H04L 5/0044; H04L 5/0053; H04L 5/0055; H04L 5/0073; H04L 5/1469; H04W 72/0446; H04W 72/121; H04W 72/1268; H04W 72/1289
See application file for complete search history.

(56) References Cited

OTHER PUBLICATIONS

Nokia Siemens Networks et al. "Reference configuration method for dynamic UL-DL Reconfiguration" 3GPP TSG-RAN WG1 Meeting #73, R1-132298, 2013, 4 pages.

3GPP, 3rd Generation Partnership Project; Technical Specification Group Radio Access Network; LTE; Evolved Universal Terrestrial Radio Access (E-UTRA); Physical layer procedures (Release 11) 3GPP Standard; 3GPP TS 36.213 V11.3.0, 2013, 178 pages.

Research in Motion et al. "HARQ design in TDD eIMTA" 3GPP TSG RAN WG1 Meeting #73, R1-132386, 2013, 5 pages.

HTC "On HARQ Timing Issues in TDD eIMTA Systems" 3GPP TSG RAN WG1 Meeting #73, R1-132076, 2013, 6 pages.

Ericsson et al. "On efficient signaling of Dynamic TDD" 3GPP TSG-RAN WG1 #73, R1-132024, 2013, 3 pages.

* cited by examiner

METHOD AND DEVICES FOR SOLVING RESOURCE CONFLICT ISSUES AMONG DYNAMIC TDD CAPABLE UE

CROSS REFERENCE TO RELATED APPLICATION(S)

This application is a 35 U.S.C. § 371 National Phase Entry Application from PCT/SE2014/050925, filed Aug. 8, 2014, designating the United States, and also claims the benefit of U.S. Provisional Application No. 61/863,841, filed Aug. 8, 2013. The disclosures of both applications are incorporated herein in their entirety by reference.

TECHNICAL FIELD

This disclosure relates generally to conflict resolution of network resources and, more particularly, to methods, devices, and computer program products for solving Physical Uplink Control Channel (PUCCH) Hybrid Automatic Retransmission Request (HARQ) resource conflict issues among dynamic time division duplex (TDD) capable user equipment (UE).

BACKGROUND

TDD has the flexibility of adapting time resources between uplink and downlink transmissions. By dynamically changing the uplink/downlink (UL/DL) ratio to match the instantaneous traffic situation, the end-user performances can be improved. Another benefit of dynamic TDD is network energy saving, i.e. the improvement of downlink resource utilization allows an evolved NodeB (eNB) to configure downlink (DL) subframes more efficiently so that energy saving can be achieved.

In general, it is not preferable to change the UL/DL among macro sites at least not on a small time scale. However, for heterogeneous network, it is very likely that only a few user terminals are active simultaneously per local-area node, which implies a high possibility that many neighboring cells are momentarily empty. The traffic dynamics are expected to be large with relatively low average load but high instantaneous data rates. In this case the traffic asymmetry between uplink and downlink directions becomes more dominant which makes dynamic UL/DL configuration attractive.

In a dynamic TDD capable cell, both legacy UE, which does not support dynamic TDD, and advanced UE, which supports dynamic TDD can coexist. For a legacy UE, it is configured with just one TDD configuration which is in the (System Information Block) SIB message. SIB is a general term for this type of broadcast messages. There are a number of different SIB messages for different purposes and those may be numbered consecutively. For example, the TDD configuration may be transmitted in SIB1. In the following the terms SIB and SIB 1 is used interchangeably. For a dynamic TDD capable UE, the device is usually configured with one UL reference TDD configuration, and one DL reference TDD configuration. The actual TDD configuration used by an advanced UE varies within a TDD configuration group where the advanced UE's UL subframe is the subset of UL reference TDD configuration and DL subframe is the subset of DL reference TDD configuration. In order to obtain some benefit, in 3rd Generation Partnership Project (3GPP), it is agreed that the eNB notify dynamic TDD capable UE of the actual TDD configuration using explicit signaling. The explicit signaling could be in the form of a message signaled on the downlink physical control channel for example in a DCI on PDCCH.

The TDD configuration known by legacy UE can be different from dynamic TDD capable UE. Additionally, the TDD configuration known by dynamic TDD capable UEs can be different as well. Some dynamic TDD capable UE may know the up to date TDD configuration via explicit signaling. However, some dynamic TDD capable UE may instead know the old TDD configuration based on previous explicit signaling. This inconsistency of TDD configuration results in PUCCH HARQ resource conflict issues. For example, two UEs may transmit feedback on the same resource leading to problems with determining what was received by the base station. In this regard, when different UE have inconsistent TDD configurations, PUCCH HARQ resource conflicts result when different UE with different TDD configurations need feedback DL HARQ on the same UL subframe.

Furthermore, if a dynamic TDD capable UE did not detect the TDD configuration in the explicit signaling due to either bad radio channel quality or DRX, the eNB and UE will have different view on the TDD configuration to be used. For example, one issue, that arise when there is a different view on which TDD configuration to be used, relates to the PUCCH format 3 encoding/decoding as the PUCCH format 3 encoding/decoding is based on which TDD configuration is used. The PUCCH timing and resource mapping is also based on the used TDD configuration.

SUMMARY

Embodiments herein are directed to keeping two TDD configurations in the dynamic TDD cell concurrently to solve PUCCH HARQ resource confliction and timing issues.

In some embodiments, Legacy UE always allocates PUCCH HARQ resource according to TDD configuration in the SIB. Additionally, dynamic TDD capable UE always allocates PUCCH HARQ resource according to downlink reference TDD configuration which is the same for all dynamic TDD capable UE, independent of the explicit signaling. The explicit signaling may for example be signaled using a downlink control information, DCI, message on the Physical Downlink Control Channel, PDCCH.

In further embodiments, Legacy UE always allocates PUCCH HARQ resource according to TDD configuration in the SIB. Furthermore, the TDD configuration of dynamic TDD capable UE that detect the latest explicit signaling uses the up-to-date TDD configuration to save PUCCH resources. The TDD configuration of dynamic TDD capable UE that did not monitor explicit signaling due to DRX or miss detect explicit signaling uses the TDD configuration in the SIB. Therefore, only two TDD configurations are in the system.

In some embodiments, if PUCCH format 3 is configured, two groups of PUCCH format 3 resources are allocated to dynamic TDD capable UE, one group is used corresponding to TDD configuration in the SIB, the other group is used corresponding to TDD configuration in DL reference configuration. That is, which PUCCH format 3 resource is used depends on if UE detect explicit signaling or not.

In some embodiments, as the eNB does not know if UE know the TDD configuration in explicit signaling or not, the eNB uses blind detection to detect DL HARQ feedback on two different PUCCH resources.

In one embodiment a method is disclosed for a device for preventing data transmission configuration conflict between the device and a base station. The method comprising receiving a control message from the base station. The method further comprises determining a first data transmission configuration from the received control message and determining a second data transmission configuration from a candidate set of configurations wherein the candidate set of configurations is associated with the first data transmission configuration. The method further comprises transmitting data to the base station in accordance with the second data transmission configuration.

In another embodiment a device is disclosed that is operable in a communication network to transmit messages to and receive messages from a base station over a half-duplex channel. The device comprises a processor, a memory coupled to the processor, a transceiver coupled to the processor and an antenna coupled to the transceiver configured to transmit and receive messages. The processor is configured to receive a control message from the base station. The processor is further configured to determine a first data transmission configuration from the received control message and to determine a second data transmission configuration from a candidate set of configurations, wherein the candidate set of configurations is associated with the first data transmission configuration. The processor is further configured to transmit data to the base station in accordance with the second data transmission configuration.

In another embodiment a method is disclosed for a node communicating with a plurality of mobile devices. The method comprising transmitting, to a mobile device included in the plurality of mobile devices, a control message including a first data transmission configuration. The method further comprises receiving data from the mobile device in accordance with a second data transmission configuration determined from a set of configurations, wherein the set of configurations is associated with the first data transmission configuration information.

In another embodiment a node is disclosed that is operable to communicate with a plurality of mobile devices and operable in a cell in a communication network. The node comprises a processor, a memory coupled to the processor; a network interface coupled to the processor, a transceiver coupled to the network interface. The processor is configured to transmit, to a mobile device included in the plurality of mobile devices, a control message including first data transmission configuration. The processor is further configured to receive data from the mobile device in accordance with second data transmission configuration information determined from a set of configurations, wherein the set of configurations is associated with the first data transmission configuration information.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Embodiments are directed to methods, devices, and computer program products for conflict resolution of network resources of mobile devices. More particularly, embodiments are directed to methods, devices, and computer program products for resolution of PUCCH HARQ resource conflict issues among dynamic TDD capable UEs. According to some embodiments, the disclosed techniques may be applicable, for instance, to networks and associated devices operating in accordance with the 3GPP specification.

Figure 1:
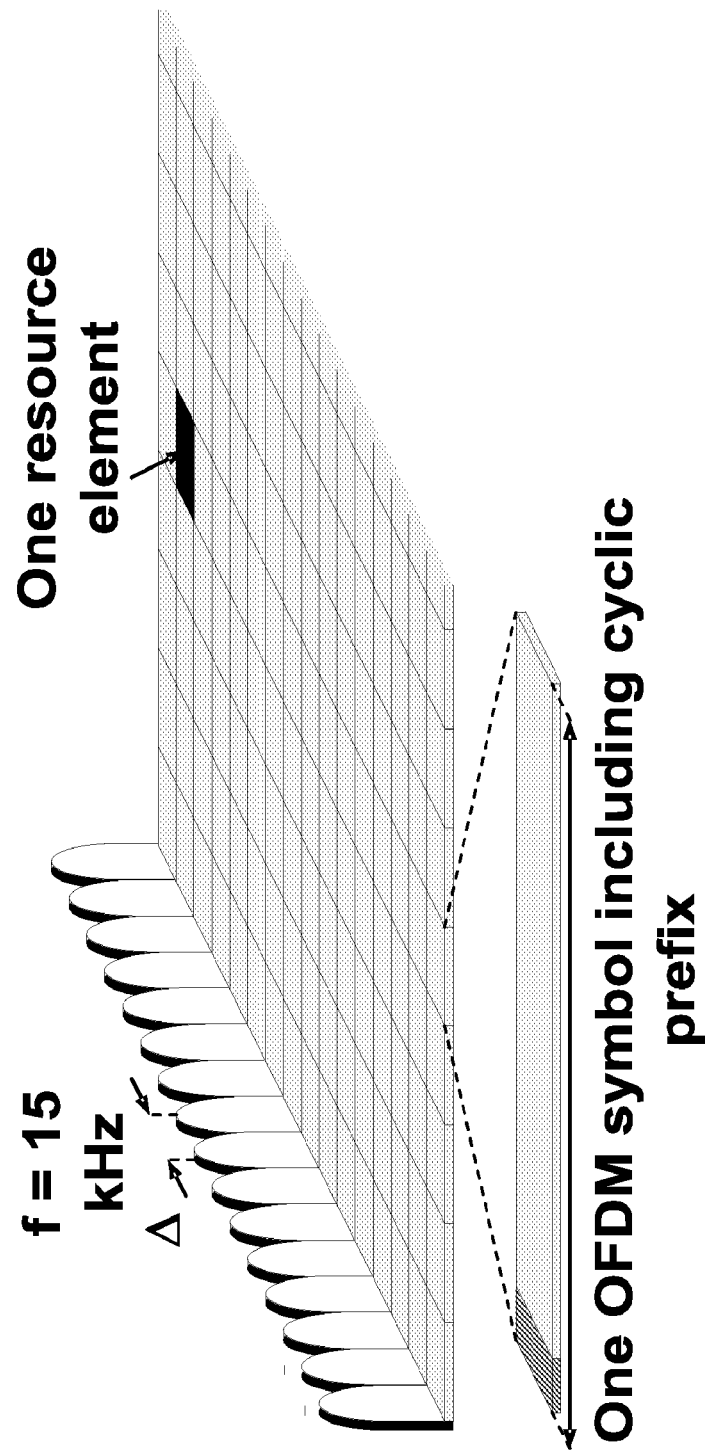
FIG. 1 is an illustration of the long term evolution (LTE) downlink physical resource.
Figure 2:
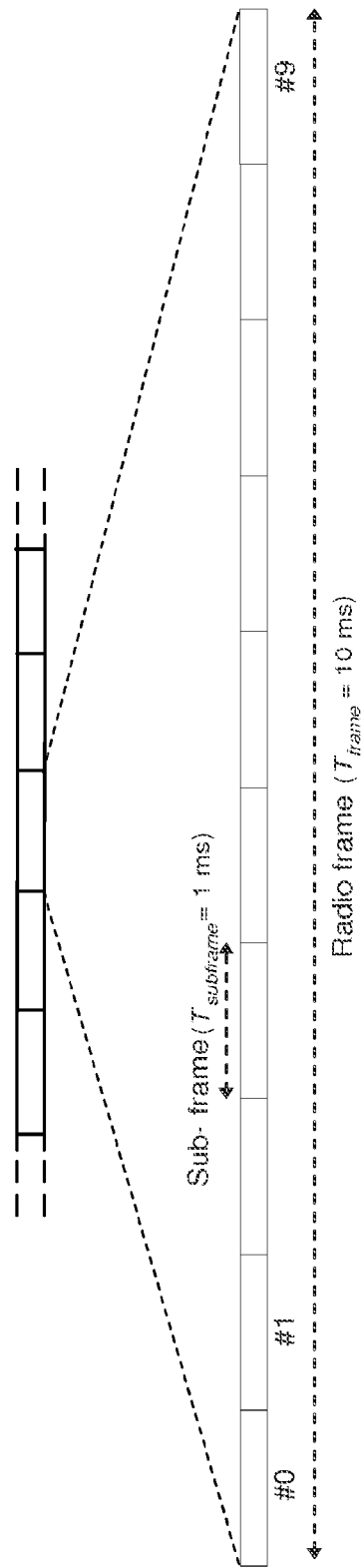
FIG. 2 is an illustration of an exemplary LTE time-domain structure.

In exemplary embodiments, LTE uses OFDM in the downlink and DFT-spread OFDM in the uplink. The basic LTE downlink physical resource can thus be seen as a time-frequency grid as illustrated in FIG. 1, where each resource element corresponds to one OFDM subcarrier during one OFDM symbol interval. In the time domain, LTE downlink transmissions are organized into radio frames of 10 ms, each radio frame consisting of ten equally-sized subframes of length Tsubframe=1 ms as illustrated in FIG. 2.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

The notion of virtual resource blocks (VRB) and physical resource blocks (PRB) has been introduced in LTE. The actual resource allocation to a UE is made in terms of VRB pairs. There are two types of resource allocations, localized and distributed. In the localized resource allocation, a VRB pair is directly mapped to a PRB pair, hence two consecutive and localized VRB are also placed as consecutive PRBs in the frequency domain. On the other hand, the distributed VRBs are not mapped to consecutive PRBs in the frequency domain, thereby providing frequency diversity for data channel transmitted using these distributed VRBs.

Figure 3:
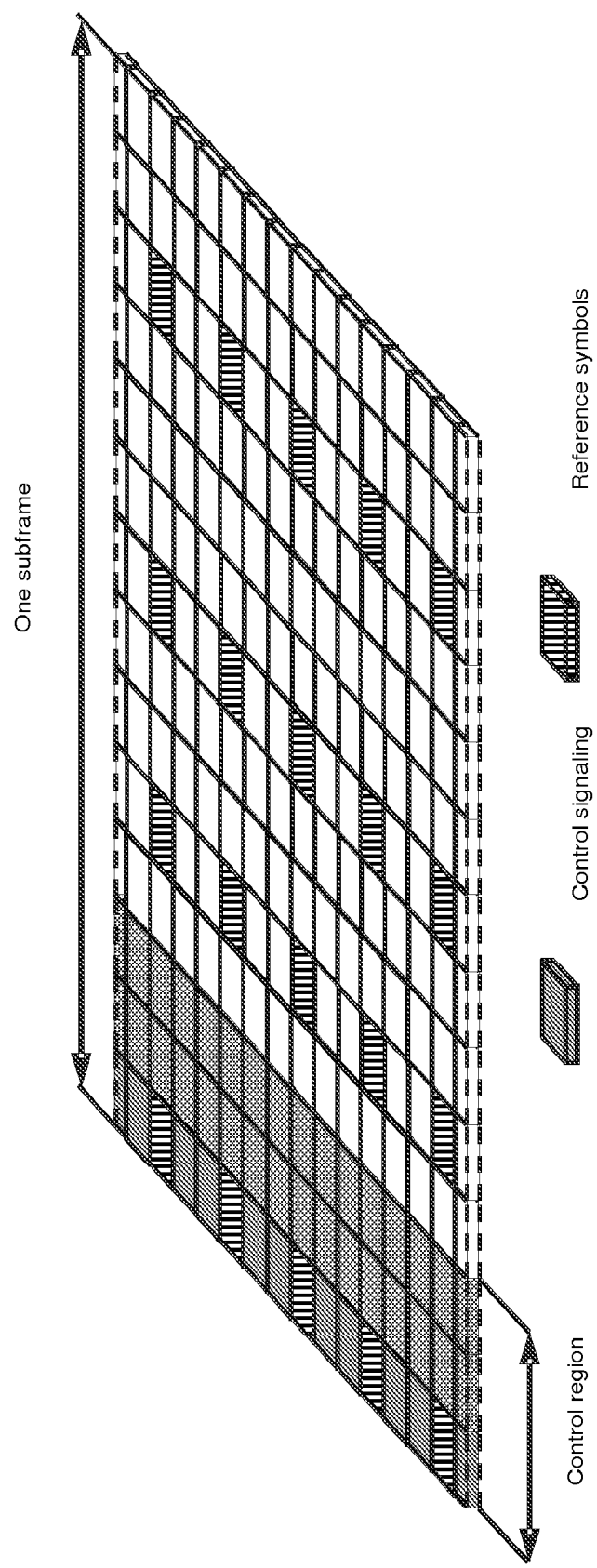
FIG. 3 is an exemplary illustration of a downlink subframe.

In some embodiments, downlink transmissions are dynamically scheduled, i.e., in each subframe the base station transmits control information about to which terminals data is transmitted and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control is illustrated in FIG. 3. From LTE Re-11 onwards above described resource assignments can also be scheduled on the enhanced Physical Downlink Control Channel (EPDCCH). For Rel-8 to Rel-10 only PDCCH is available.

Figure 10:
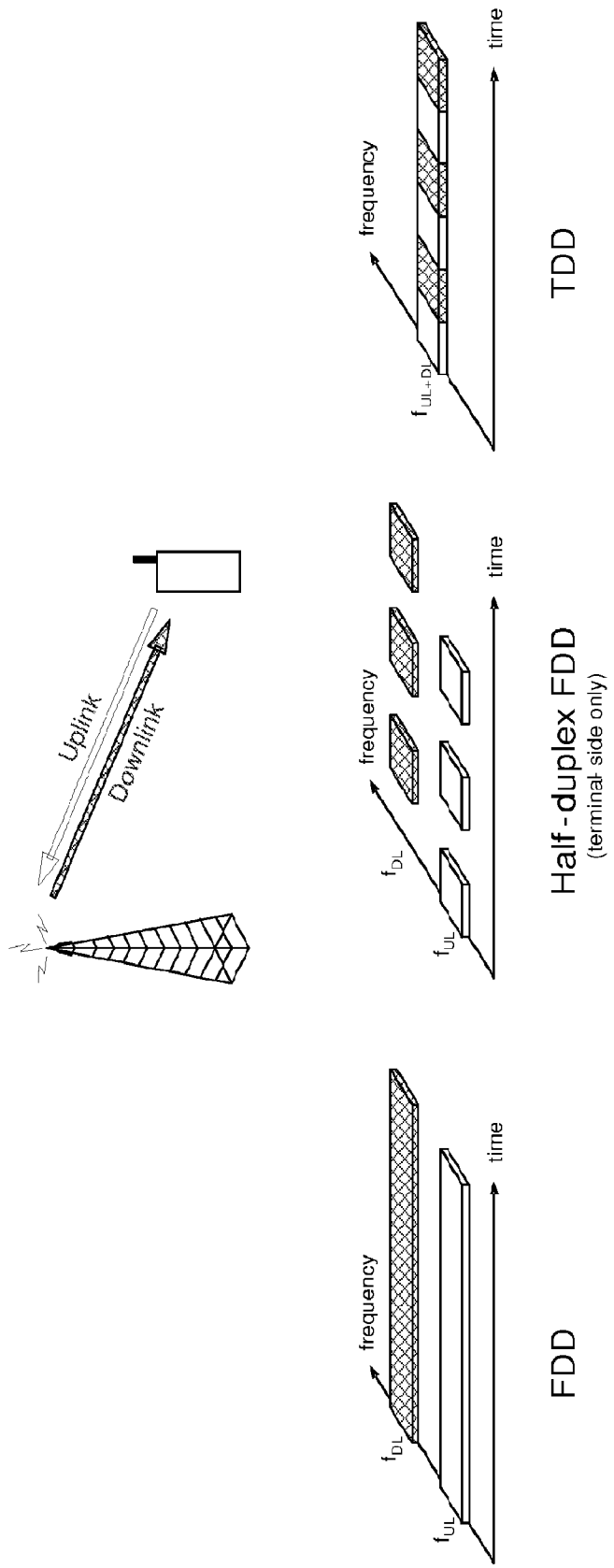
FIG. 10 is an exemplary illustration of frequency and time-division duplex.

Transmission and reception from a node, e.g. a terminal or a device in a cellular system such as LTE, can be multiplexed in the frequency domain or in the time domain (or combinations thereof). Frequency Division Duplex (FDD) as illustrated to the left in FIG. 10 implies that downlink and uplink transmission take place in different, sufficiently separated, frequency bands. Time Division Duplex (TDD), as illustrated to the right in FIG. 10, implies that downlink and uplink transmission take place in different, non-overlapping time slots. Thus, TDD operates in an unpaired spectrum, whereas FDD uses a paired spectrum.

Figure 11:
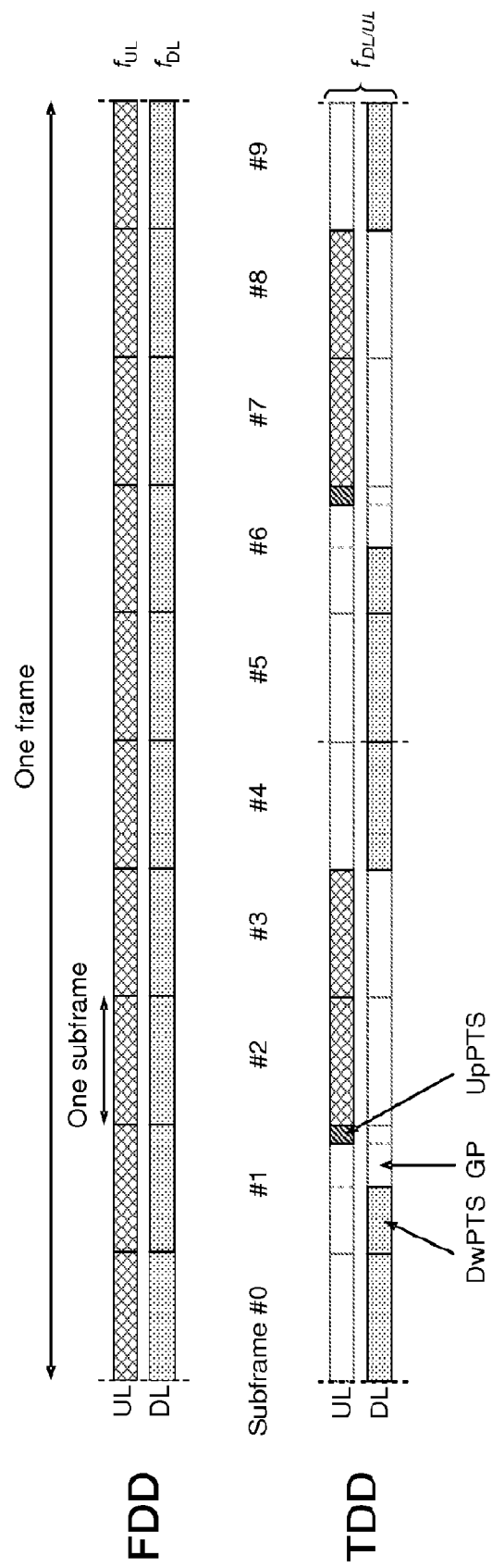
FIG. 11 is an exemplary illustration of uplink/downlink time/frequency structure for LTE in case of FDD and TDD.

Typically, the structure of the transmitted signal in a communication system is organized in the form of a frame structure. For example, LTE uses ten equally-sized subframes of length 1 ms per radio frame as illustrated in FIG. 11. In the case of FDD operation (upper part of FIG. 11), there are two carrier frequencies, one for uplink transmission ($f_{UL}$) and one for downlink transmission ($f_{DL}$). At least with respect to the terminal in a cellular communication system, FDD can be either full duplex or half duplex. In the full duplex case, a terminal can transmit and receive simultaneously, while in half-duplex operation, the terminal cannot transmit and receive simultaneously (the base station is capable of simultaneous reception/transmission though, e.g. receiving from one terminal while simultaneously transmitting to another terminal). In LTE, a half-duplex terminal is monitoring/receiving in the downlink except when explicitly being instructed to transmit in a certain subframe.

In the case of TDD operation (lower part of FIG. 11), there is only a single carrier frequency and uplink and downlink transmissions are always separated in time also on a cell basis. As the same carrier frequency is used for uplink and downlink transmission, both the base station and the mobile terminals need to switch from transmission to reception and vice versa. An essential aspect of any TDD system is to provide the possibility for a sufficiently large guard time where neither downlink nor uplink transmissions occur to avoid interference between uplink and downlink transmissions. For LTE, this guard time is provided by special subframes (subframe 1 and, in some cases, subframe 6), which are split into three parts: a downlink part (DwPTS), a guard period (GP), and an uplink part (UpPTS). The remaining subframes are either allocated to uplink or downlink transmission.

Figure 12:
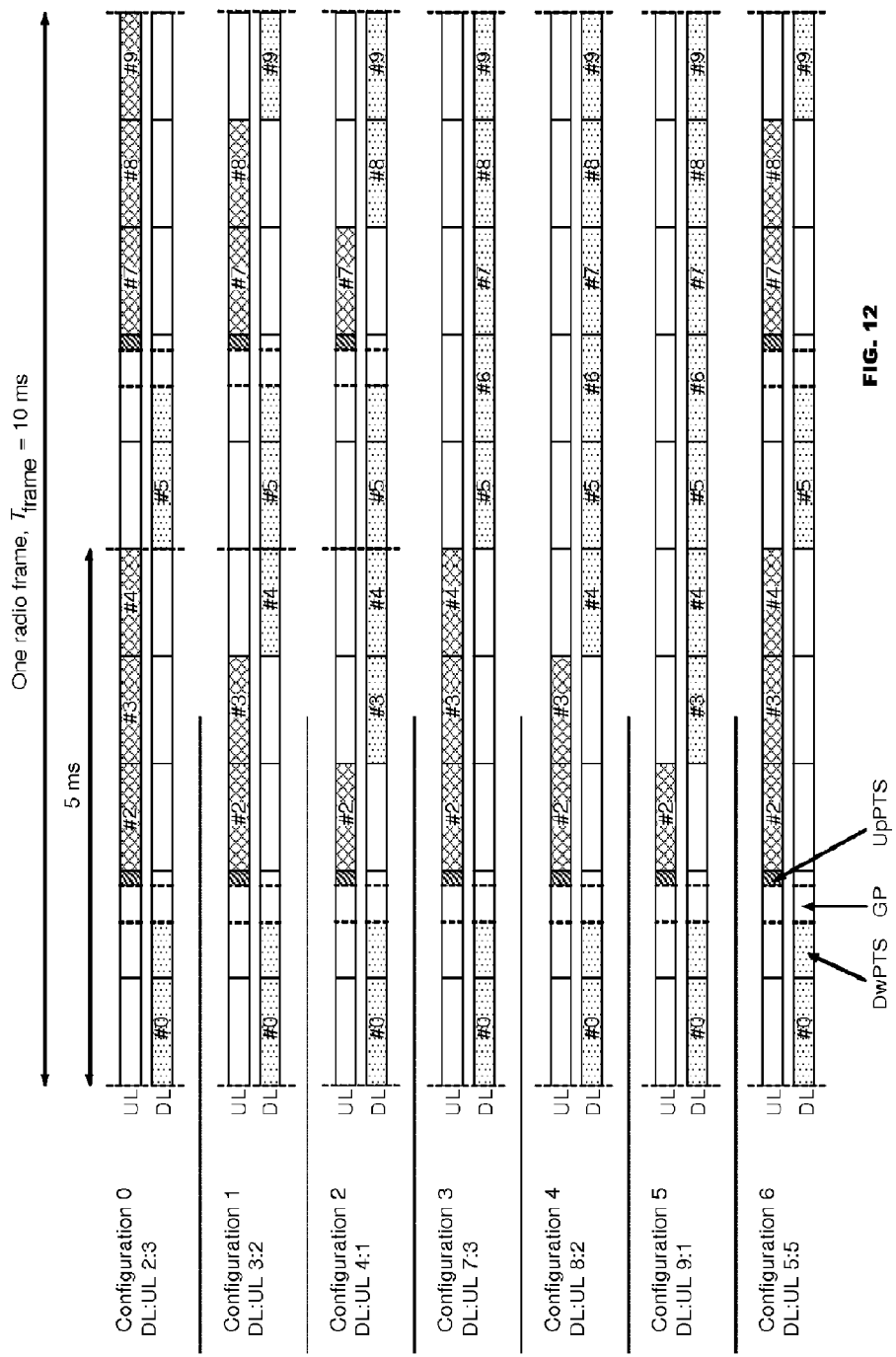
FIG. 12 is an exemplary illustration of different downlink/uplink configurations in case of TDD.

TDD allows for different asymmetries in terms of the amount of resources allocated for uplink and downlink transmission, respectively, by means of different downlink/uplink configurations. In LTE, there are seven different configurations as shown in FIG. 12. These configurations may also be referred to as data transmission configuration or equivalently data transmission configuration information. Note that in the description below, DL subframe can mean either DL or the special subframe.

Figure 13:
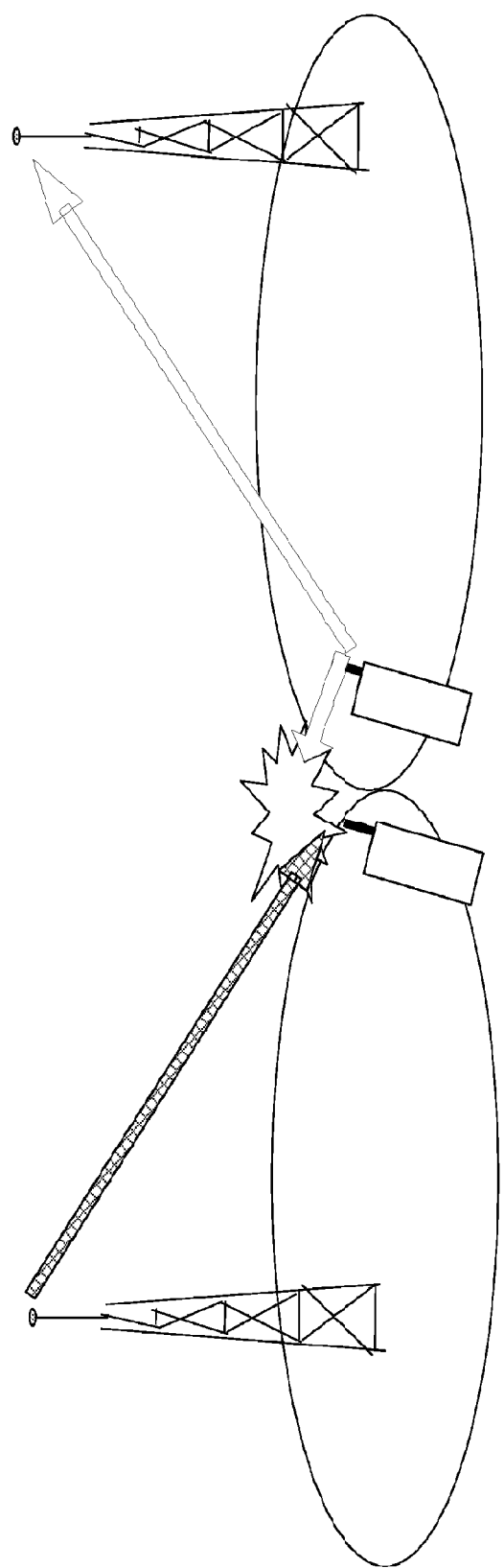
FIG. 13 is an exemplary illustration of UL-DL interference in TDD.

To avoid severe interference between downlink and uplink transmissions between different cells, neighbor cells should have the same downlink/uplink configuration. If this is not done, uplink transmission in one cell may interfere with downlink transmission in the neighboring cell (and vice versa) as illustrated in FIG. 13. Hence, the downlink/uplink asymmetry typically does not vary between cells, but is signaled as part of the system information, for example in a SIB message, and remains fixed for a long period of time.

The timings for HARQ A/N feedbacks for the PDSCH are specified with extensive tables and procedure descriptions for each U/D configurations in the publication 3GPP 36.213 Release 11, the entire contents of which are incorporated herein by reference.

The UE shall also feed back PDSCH decoding A/N information in pre-defined UL subframes. The UE shall transmit such HARQ A/N response on the PUCCH in UL subframe n if there is PDSCH transmission indicated by the detection of corresponding PDCCH or there is PDCCH indicating downlink SPS release within subframe(s) n−k, where k is within the association set K={$k_0$, $k_1$, . . . , $k_{M-1}$} listed in Table 1. In other words, table 1 dictates which DL subframes that should be reported in a UL subframe.

TABLE 1

Downlink association set index K = {$k_0$, $k_1$, . . . , $k_{M-1}$} for TDD

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |

TABLE 1-continued

Downlink association set index K = {k₀, k₁, . . . , k_{M−1}} for TDD

| UL-DL Configuration | 0 | 1 | 2 | 3 | 4 | 5 | 6 | 7 | 8 | 9 |
|---|---|---|---|---|---|---|---|---|---|---|
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

As an example

For the UL subframe where n=7 for UL-DL configuration 1, Table 1 shows K={7,6}, which corresponds to carrying or transmitting in subframe 7 possible HARQ A/N feedbacks for PDSCHs transmitted in subframes 7−7=0 and 7−6=1.

Similarly, for the UL subframe where n=2 for UL-DL configuration 2, Table 1 shows K={8,7,4,6}, which corresponds to carrying or transmitting in subframe 2 possible HARQ A/N feedbacks for PDSCHs transmitted in subframes 4, 5, 6, and 8 of the preceding frame.

There are generally two pools of PUCCH resources available to transmit HARQ A/N feedbacks for PDSCH transmissions.

Figure 4:
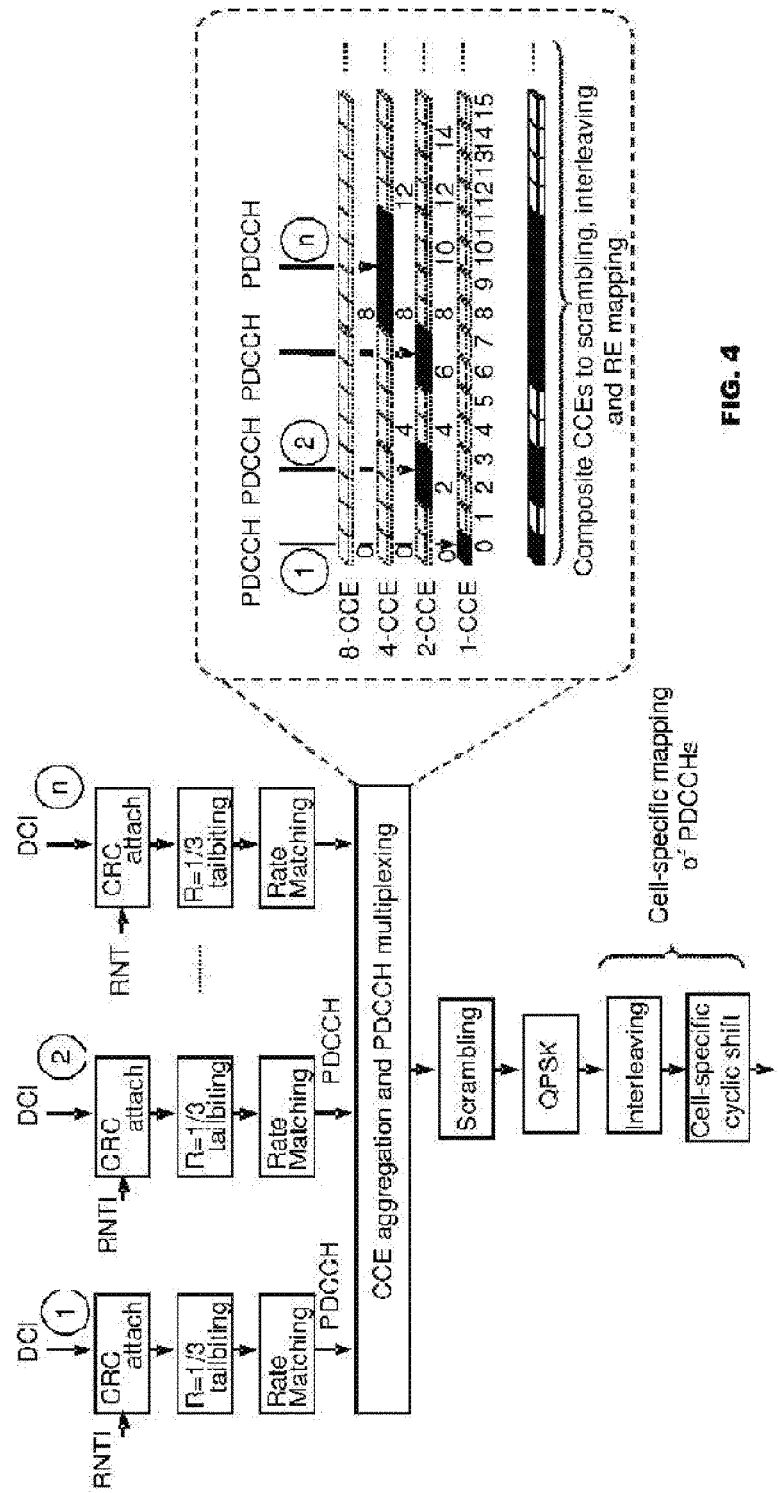
FIG. 4 illustrates exemplary processing procedures for Physical Downlink Control Channels (PDCCHs).

Dynamic PUCCH Resources—For a PDSCH transmission indicated by the detection of a corresponding PDCCH in subframe $n-k_m$, where $k_m \in K$, on the primary cell, or for a PDCCH indicating downlink SPS release (defined in 3GPP 36.213 Release 11) in subframe $n-k_m$, where $k_m \in K$ on the primary cell, the PUCCH resource is determined by the number of the first CCE used for transmission of the corresponding DCI assignment (which is denoted by $n_{CCE,m}$ in the LTE specs 3GPP 36.213 Release 11, see also illustrations in FIG. 4).

Static PUCCH Resources—For a PDSCH transmission on the primary cell where there is not a corresponding PDCCH detected within subframe(s) n−k, where k∈K, the PUCCH resources are determined according to a higher layer configuration. For a PDSCH transmission indicated by the detection of a corresponding PDCCH within subframe(s) n−k, where k∈K, on the secondary cell, the PUCCH resources are selected from a PUCCH resource pool determined according to higher layer configuration. The TPC field in the DCI format of the corresponding PDCCH shall be used to determine the PUCCH resource values from PUCCH resource pool configured by higher layers.

When UEs are configured for dynamic TDD, legacy UE use the TDD configuration broadcasted in the SIB1, while dynamic TDD capable UE generally have two reference UL-DL configurations, one for UL and one for DL. The UL reference configuration is the same as that used by legacy UE, i.e. broadcasted in the SIB1. The DL reference TDD configuration is informed to dynamic TDD capable UEs via dedicated signaling or explicit signaling. The explicit signaling can be used to notify dynamic TDD capable UE which TDD configuration to use. For example the explicit signaling may be used to signal to a dynamic TDD capable UE which DL reference TDD configuration to use. The signaling may for example be performed using the DCI on the PUCCH.

Since different dynamic TDD capable UEs work with different conditions, e.g. some in DRX active time, some in DRX sleep time, some in good radio channel quality, some in bad radio channel quality, although explicit signaling is sent to them to notify the TDD configuration, the view of the TDD configuration among them can be different.

Figure 14:
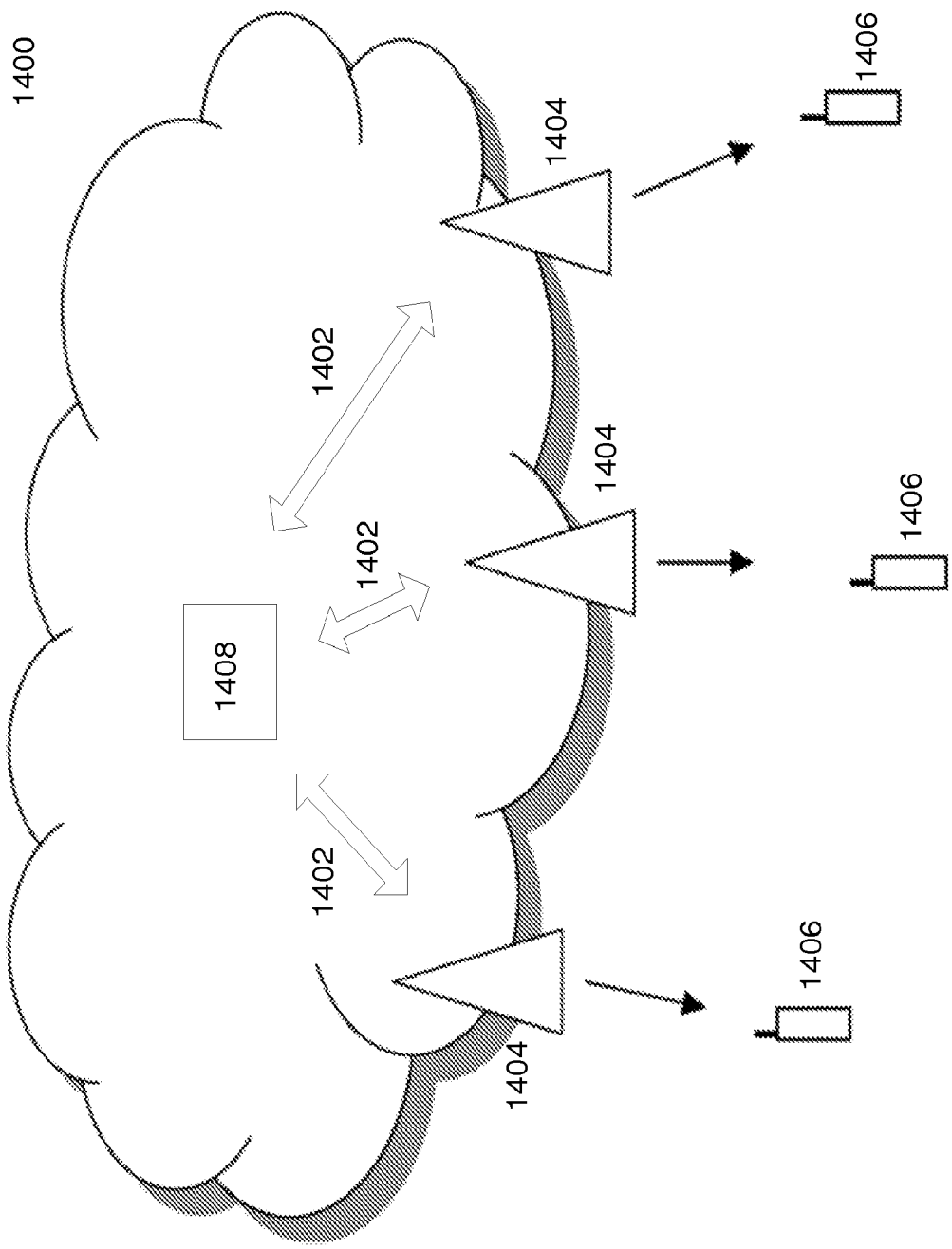
FIG. 14 illustrates an exemplary embodiment of a wireless communication deployment.

Referring to FIG. 14, a wireless communication deployment 1400 in accordance with exemplary embodiments includes an access node 1404 serving a wireless communication device (WCD) 1406. Examples of WCDs include, but are not limited to, mobile telephones, user equipments (UEs), personal digital assistants, electronic readers, portable electronic tablets, wireless sensors, machine communication devices, personal computers, and laptop computers. Furthermore, the device 1406 may be a legacy UE or dynamic TDD capable UE. Access node 1404 may be, for example, a base station, an eNodeB, relay node, or gateway type device, and is capable of communicating with device 1406, along with any additional elements suitable to support wireless communication between wireless communication devices or between a wireless communication device and another communication device, such as landline telephone. The access node 1404 may be in communication with, for instance via a network 1402, one or more control nodes 1408, such as a Radio Network Controller (RNC), a Mobility Management Entity (MME), a Mobile Switching Center (MSC) or Base Station Subsystem (BSS). Although node 1408 is explicitly identified as a control node, each of nodes 1404, 1406, and 1408 may be understood as a "control" node to the extent that it includes a control unit or otherwise implements control functions.

According to a first TDD configuration conflict resolution embodiment, legacy UE always follows TDD configuration in the SIB. Furthermore, dynamic TDD capable UEs is configured the same DL reference TDD configuration and always allocates PUCCH HARQ resource according to the DL reference TDD configuration irrespective of the currently used TDD configuration in explicit signaling. The notation according to some embodiments is that the DL reference configuration which is the same for all dynamic TDD capable UEs is referred to as downlink HARQ reference configuration or DL HARQ reference configuration. The notation is used to indicate that the DL reference configuration is used for HARQ feedback. Once the TDD configuration for the Legacy UE is determined from the SIB, the DL HARQ reference TDD is determined as a reference configuration that is applicable with the legacy TDD configuration in the SIB. As an example, as illustrated in Table 2, the applicable DL reference TDD can be determined by deriving the applicable HARQ timings for each configuration, wherein a configuration is only an applicable reference configuration if the feedback from the DL subframes is derived to be transmitted in UL subframe. This is illustrated in Table 2.

TABLE 2

DL reference configuration candidate sets.

| SIB U/D configuration | Applicable DL HARQ reference configuration candidate set |
|---|---|
| 0 | {0, 6, 1, 3, 2, 4, 5} |
| 1 | {1, 2, 4, 5} |
| 2 | {2, 5} |
| 3 | {3, 4, 5} |
| 4 | {4, 5} |
| 5 | {5} |
| 6 | {6, 1, 3, 2, 4, 5} |

According to one embodiment, the signaling of which DL reference configuration set is applicable could, be adjusted so it only supports a subset of all DL/UL configuration so that the applicable reference configurations matches that for example Table 2. Note that the DL reference configuration used by all dynamic capable UEs may be referred to as the DL HARQ reference configuration From the configured reference configuration i.e. the configuration signaled using the SIB, in some embodiments, the UE would derive the applicable DL HARQ reference configuration in accordance with Table 1. Some of the subframes within the DL reference configuration could be defined as DL subframes while in the currently used SIB configuration there are defined as UL subframes or/and special subframes with a DwPTS that is of configuration #0 and #5 for normal CP and configuration #0 and #4 for extended CP. For such a case, the UE may define the HARQ states for such subframes to be either NACK or DTX. In order words this means that these subframes are included in the coding of the HARQ feedback message but with a, at the receiver eNB, known state. The UE may therefore encode HARQ feedback values from downlink subframes according to the SIB configuration and the DL HARQ reference configuration when transmitting HARQ feedback in some uplink subframes. The eNB could then when decoding the joint HARQ message from the UE take advantage of that the some of the HARQ state bits are set as NACK and DTX and not try to decode these HARQ states.

Furthermore, the UE may assign power to the PUCCH transmission including HARQ feedback only based on the actual number of DL subframes and/or DwPTS subframes that generates HARQ feedback that is given by the union of the DL reference configuration and the currently used UL/DL configuration as indicated in the SIB. As an example, the UE would exclude the HARQ bits that correspond to UL subframes or DwPTS subframes as given by the above text and only assign power based on the number of DL subframes or/and DwPTS that generates HARQ feedback.

Moreover, in the first TDD configuration conflict resolution embodiment, the eNB can only configure scheduling request resources and/or periodic CSI reporting is subframes that correspond to UL subframes based on the DL reference format or equivalently the DL HARQ reference configuration.

This paragraph gives an overview of the interaction between a device and a node for preventing data transmission configuration conflict between the device and the node. The node transmits a control message which is received by the device. The device determines a first data transmission configuration from the received control message. The device then determines a second data transmission configuration from a candidate set of configurations wherein the candidate set of configurations is associated with the first data transmission configuration. The device then transmits data and wherein the node receives the data in accordance with the second data transmission configuration.

Figure 15:
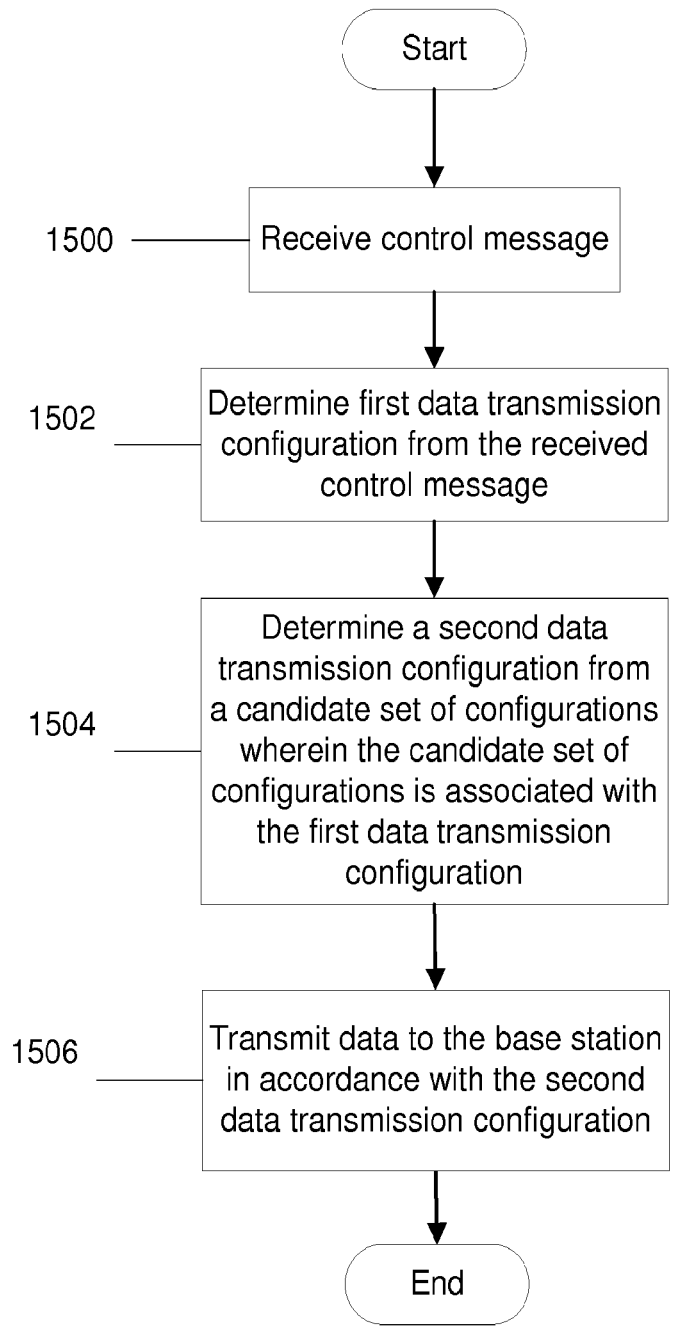
FIG. 15 illustrates an exemplary embodiment of a process for implementing a first TDD configuration conflict resolution embodiment for a device.

FIG. 15 illustrates an embodiment of a process for implementing the first TDD configuration conflict resolution embodiment. As an example, the process illustrated in FIG. 15 may be implemented by device 1406 (FIG. 14). According to some embodiments, the process starts at step 1500 where a control message, for example a SIB, is received from the base station. Using SIB is only one example that makes use of L1 signaling. It is also possible to use other forms of signaling to inform a UE about a first data transmission configuration. In step 1502, a first data transmission configuration is determined from the received control message. For example the TDD configuration included in the SIB is determined. In step 1504, a second data transmission configuration from a candidate set of configurations is determined or selected wherein the candidate set of configurations is associated with the first data transmission configuration. This may also be expressed as the reference TDD configuration that is applicable with the legacy TDD configuration included in the SIB is determined. The candidate set of configurations may in one example be predetermined. In one example the second data transmission configuration is a downlink HARQ reference configuration. I yet another example the downlink HARQ reference configuration is the same for all dynamic TDD capable UEs. Preferably the downlink HARQ reference configuration is the same for all dynamic TDD capable UEs in the same cell. As an example, in step 1504, Table 2 is used, as described above, to determine or select the reference TDD configuration. As an example, the determining 1504 of the second data transmission configuration may be based on a predefined rule and/or a rule indicated by node 1404 dictating which second data transmission configuration from the candidate set to use based on the first data transmission configuration. In another example, the determining 1504 of the second data transmission configuration may be based on an instructions from node 1404 dictating which second data transmission configuration to be use from the candidate set based on the first data transmission configuration. In step 1506, data is transmitted to the base station in accordance with the second data transmission configuration. As an example the data comprises Hybrid Automatic Repeat Request feedback. In another example the Hybrid Automatic Repeat Request feedback is transmitted using PUCCH format 3.

In one example the device is a wireless communication device that is dynamic Time Division Duplex, TDD, capable. In another example the first data transmission configuration is a time division duplex, TDD, configuration. In another example the control message is a system information block, SIB or SIB message.

Figure 16:
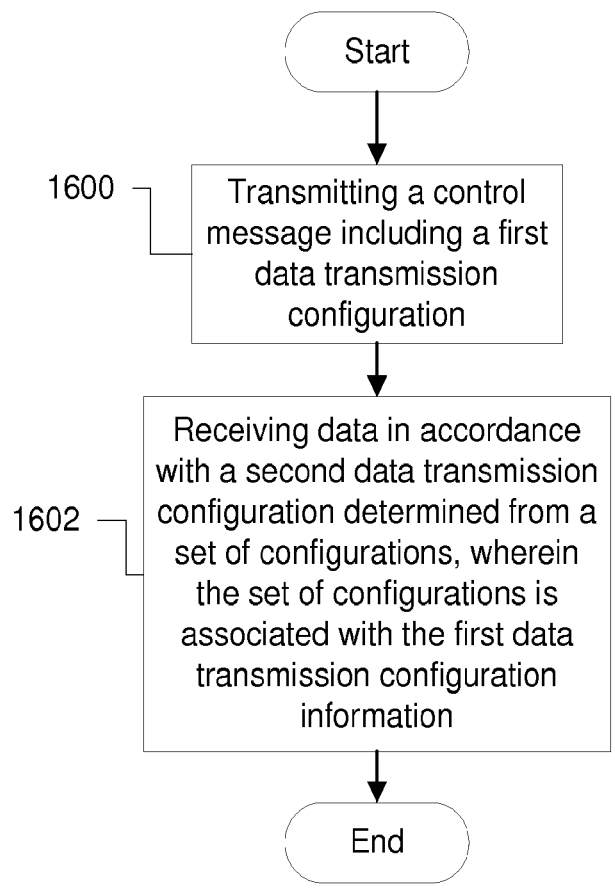
FIG. 16 illustrates an exemplary embodiment of a process for implementing a first TDD configuration conflict resolution embodiment for a node.

Similarly a corresponding process and/or method may be implemented in node communicating with a plurality of mobile devices. FIG. 16 illustrates an embodiment of a process for implementing the first TDD configuration conflict resolution embodiment. As an example, the process illustrated in FIG. 16 may be implemented by node 1404 (see for example FIG. 14). According to some embodiments, the process starts may start with step 1600, by transmitting, to a mobile device included in the plurality of mobile devices, a control message including first data transmission configuration. The device may be a device as discussed above. The process may continue in step 1602 by receiving data from the mobile device in accordance with a second data transmission configuration determined from a set of configurations, wherein the set of configurations is associated with the first data transmission configuration information.

As discussed, in one example the second data transmission configuration is a downlink HARQ reference configuration. In another example the downlink HARQ reference configuration is the same for all dynamic TDD capable mobile devices of the plurality of mobile devices. Preferably the downlink HARQ reference configuration is the same for all dynamic TDD capable UEs in the same cell.

In another example the data comprises Hybrid Automatic Repeat Request feedback. In another example the Hybrid Automatic Repeat Request feedback is received using PUCCH format 3. In another example the first data transmission configuration is a time division duplex (TDD) configuration. In another example the control message is a system information block or a SIB message.

According to a second TDD configuration conflict resolution embodiment, legacy UE always follow TDD configuration in the SIB. Furthermore, dynamic TDD capable UE that detect explicit signaling follow the TDD configuration in explicit signaling. Additionally, dynamic TDD capable UE that is in a sleep mode or does not detect explicit signaling when explicit signaling is sent follow the TDD configuration in the SIB. This second TDD configuration conflict resolution embodiment permits each dynamic TDD capable UE to know whether the TDD configuration it uses is the latest or not. This determines the TDD configuration the dynamic TDD capable UE chooses when allocating PUCCH HARQ resources.

According to the second TDD configuration conflict resolution embodiment, the transmission timing of explicit signaling are fixed and periodic. These transmission timings are known by dynamic TDD capable UE via RRC signaling. Since each dynamic TDD capable UE know when the latest explicit signaling is sent and when the next explicit signaling will come, so each dynamic TDD capable UE can know if it misses the latest explicit signaling or not.

If the dynamic TDD capable UE determines that it misses the latest explicit signaling, it uses the TDD configuration in SIB when allocating PUCCH HARQ resources. However, if the dynamic TDD capable UE finds it detects the latest explicit signaling, it uses the TDD configuration in the explicit signaling when allocate PUCCH HARQ resource.

Figure 17:
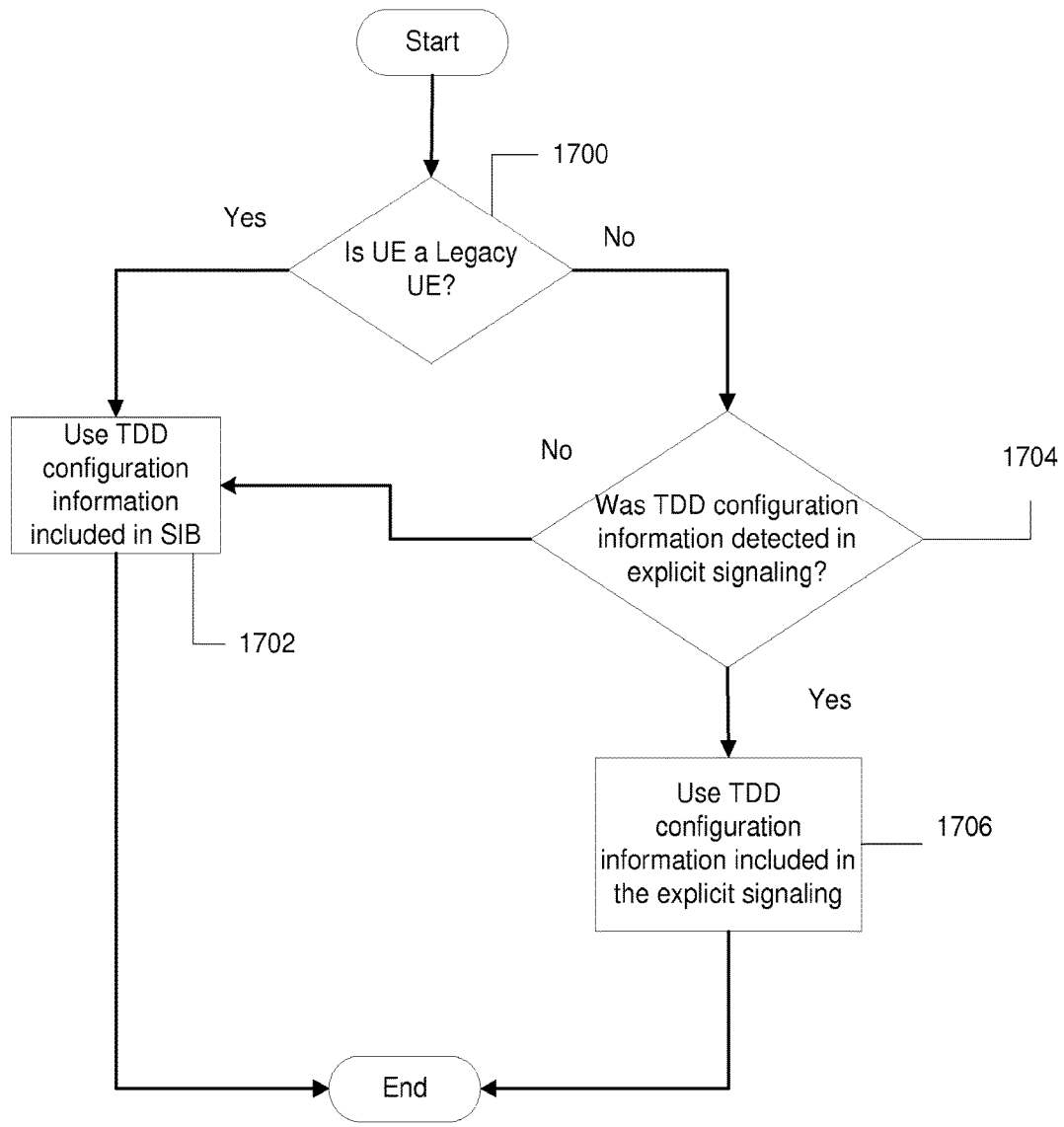
FIG. 17 illustrates an exemplary embodiment of a process for implementing the second TDD configuration conflict resolution embodiment.

FIG. 17 illustrates an embodiment of a process for implementing the second TDD configuration conflict resolution embodiment. As an example, the process illustrated in FIG. 17 is performed by device 1406 (FIG. 14). According to some embodiments, the process starts at step 1700 to determine if the device 1406 is a legacy UE. If the device is a legacy UE, the process proceeds to step 1702 to use TDD configuration from the SIB. If the UE is not a legacy UE (i.e., UE is dynamic TDD capable UE), the process proceeds from step 1700 to step 1704 to determine if the TDD configuration was detected in the latest explicit signaling. If the TDD configuration was not detected in the latest explicit signaling, the process proceeds to step 1702 to use the TDD configuration included in the SIB. If the TDD configuration was detected in the latest explicit signaling, the process proceeds to 1706 to use the TDD configuration information included in the explicit signaling.

Figure 18:
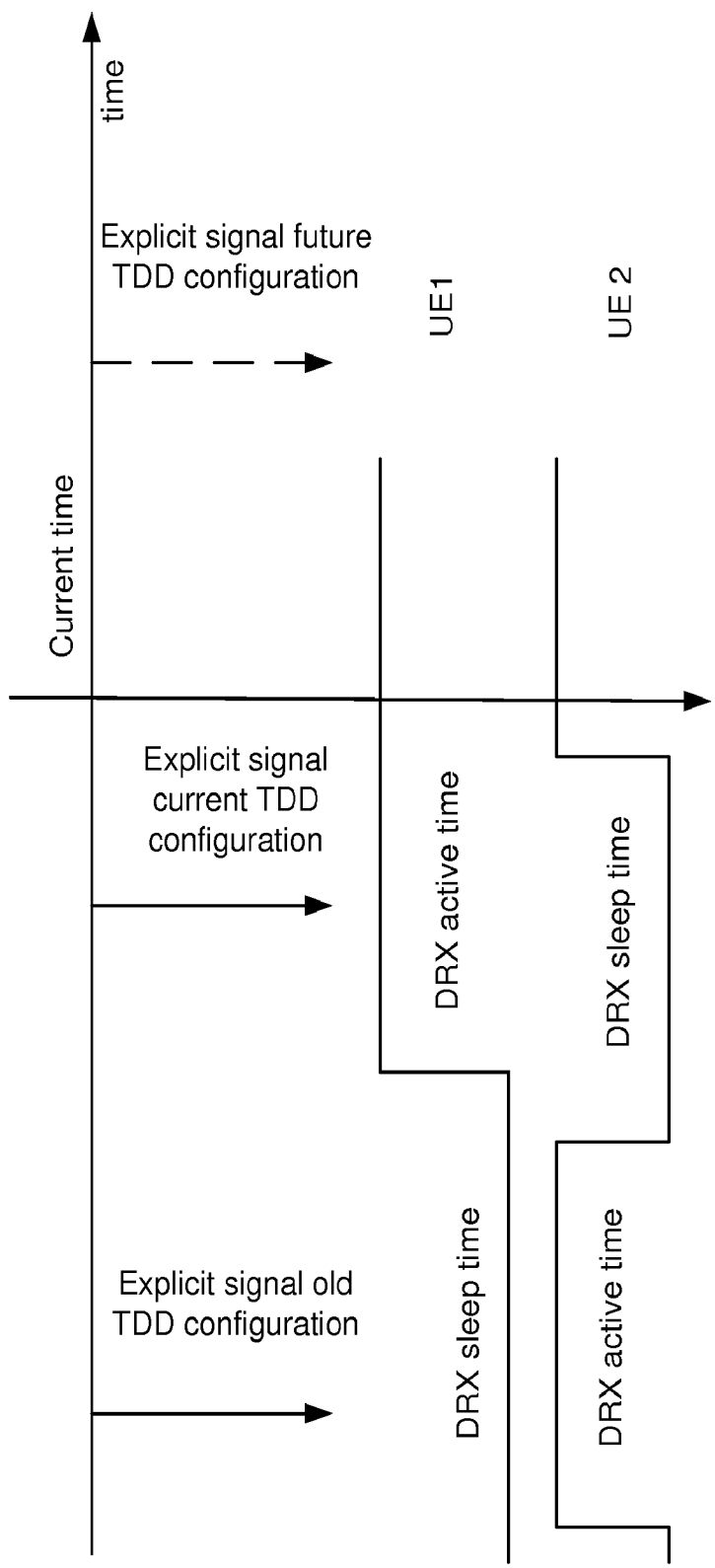
FIG. 18 illustrates an example timing diagram for two UEs.

FIG. 18 illustrates an example timing diagram for two UEs. In this example, UE1 is active when the latest explicit signaling is sent. Therefore, UE1 can follow the TDD configuration in explicit signaling when allocate PUCCH HARQ resource. Furthermore, UE2 is active when the old explicit signaling is sent but in sleep mode when the latest explicit signaling is sent. Therefore, when UE2 is active again, UE2 allocates PUCCH HARQ resources according to TDD configuration in the SIB instead of the TDD configuration it detected before.

According to some embodiments, for eNB, if explicit signaling is not very robust, or if the failure to detect explicit signaling cannot be ignored, eNB has to detect DL HARQ feedback for dynamic TDD capable UE via blind detection, i.e. eNB has to detect at HARQ feedback both at the resource corresponding to TDD configuration in the SIB when dynamic TDD capable UE miss the explicit signaling and at the resource corresponding to TDD configuration in explicit signaling when dynamic TDD capable UE detect explicit signaling.

According to some embodiments, the described embodiments apply not only to PUCCH format 1a, 1b, 2a, 2b but also to PUCCH format 3 as well. For PUCCH format 1a, 1b, 2a, 2b the resource is dynamically allocated. For PUCCH format 3, the resource is semi-statically allocated via RRC signaling. eNB need to allocate two group of resources for PUCCH format 3, one for TDD configuration in SIB, one for DL reference TDD configuration.

Based on either the first or second TDD configuration conflict resolution embodiment, there will be UEs operating different reference configurations on the same cell. Since some of the PUCCH resources are derived from CCE index on PDCCH, the allocated resources may collide even if separate CCE resource are used as the UE that is not operating in dynamic TDD mode while deriving its PUCCH resource does so in another manner than a UE that does assume a dynamic TDD operation. In this regard, there are 2 UEs using different mapping functions to derive resources. Thus, even with separate input in terms of CCEs and subframes, the derived resources may be the same.

The following are exemplary embodiments of resource conflict resolution.

In a first resource conflict resolution embodiment, the UE shall use dynamic PUCCH resources for a PDSCH transmission indicated by the detection of a corresponding PDCCH in subframe $n-k_m$, where $k_m \in K_I$, and static PUCCH resources for a PDSCH transmission indicated by the detection of a corresponding PDCCH in subframe $n-k_m$, where $k_m \in K_D$, where $K_I$ is the intersection of the set K as determined by the UL-DL configuration given by SIB and the set $K_R$ as determined by the DL reference configuration. That is, $K_I$ contains only $k_m$ that are in both K and $K_R$.

$K_D$ is a difference set of $K_R$ and K. That is, $K_D$ contains only $k_m$ that are in $K_R$ but not in K. Mathematically, this can be expressed as $K_D = K_R \backslash K$.

An advantage of mapping the resources statically in this way is that it is less complex and resource efficient. This mapping further allows dynamic mapping for all subframes shared with legacy users and use semi-static or static resources for the subframes not shared with legacy users. This would avoid collisions with legacy users.

As an example of the first resource conflict resolution embodiment, consider the UE configured with UL/DL configuration 1 from the SIB configuration and UL/DL configuration 2 as the DL reference configuration. For either UL subframe 2 or 7, we have $K=\{7,6\}$ and $K_R=\{8,7,4,6\}$. The UE shall use dynamic PUCCH resources for a PDSCH transmission indicated by the detection of a corresponding PDCCH on the primary cell in subframe $n-k_m$, where $k_m \in K_I = \{7,6\}$, and static PUCCH resources for a PDSCH transmission indicated by the detection of a corresponding PDCCH on the primary cell in subframe n-$k_m$, where $k_m \in K_D = \{8,4\}$.

In a second resource conflict resolution embodiment, for a UE practicing the first resource resolution conflict embodiment, the dynamic PUCCH resources for a PDSCH transmission indicated by the detection of a corresponding PDCCH on the in subframe n-$k_m$, where $k_m \in K_I$, using at least the parameter M, which is the size of the set K as determined by the Pcell UL-DL configuration number.

As an example of the second resource conflict resolution embodiment, consider the UE configured as in the previous example. For PDSCH transmission indicated by the detection of a corresponding PDCCH on the in subframe n-$k_m$, where $k_m \in K_I = \{7,6\}$, the dynamic PUCCH resource, e.g. the size in terms of bits of the dynamic PUCCH resource, shall be determined with at least the parameter M=2, which is the size of K={7,6}.

In a third resource conflict resolution embodiment, for a UE practicing the first resource conflict resolution embodiment, the TPC field in the DCI format of the PDCCH on the in subframe n-$k_m$ where $k_m \in K_D$, shall be used to determine the PUCCH resource or PUCCH resource values from a PUCCH resource pool configured by higher layers. The PUCCH resource determination is shown in table 3. In Table 3, the higher layer configured resource may be dependent on M, which is the size of $K_D$. This dependency can be realized either by configuring multiple resources and use a mapping function from M and TPC command or by applying a permutation function to the set of configured resources.

TABLE 3

PUCCH Resource Value Determination.

| Value of 'TPC command for PUCCH' | $n_{PUCCH,j}^{(1)}$ or $(n_{PUCCH,j}^{(1)}, n_{PUCCH,j+1}^{(1)})$ |
|---|---|
| '00' | The 1st PUCCH resource value configured by the higher layers |
| '01' | The $2^{nd}$ PUCCH resource value configured by the higher layers |
| '10' | The $3^{rd}$ PUCCH resource value configured by the higher layers |
| '11' | The $4^{th}$ PUCCH resource value configured by the higher layers |

In a fourth resource conflict resolution embodiment, a UE that is practicing resource conflict resolution embodiments 1, 2 or 3, the UE orders its A/N from each subframe so that the A/N from the intersection of the SIB1 UL-DL configuration and the DL reference configurations is located first followed by the difference set between the two sets. This can also be expressed as follows: the UE orders its A/N feedback according to a corresponding PDCCH on in subframe n-$k_m$, where $k_m \in K_A$, where $K_A$ is defined as $K_A \in \{K_I, K_D\}$.

This fourth resource conflict resolution embodiment enables the UE to be scheduled during reconfiguration of the DL reference timing configuration on the subframes that are part of both the DL reference configuration and the SIB1 UL-DL configuration during a (re-)configuration of a DL HARQ control timing as A/N to channel selection resource mapping does not change depending on which of the DL HARQ control timing configuration is used.

As an example of the fourth resource conflict resolution embodiment, consider the UE configured as in previous examples. For either UL subframe 2 or 7, we have K={7,6} and $K_R$={8,7,4,6}. The UE shall use dynamic PUCCH resources for a PDSCH transmission indicated by the detection of a corresponding PDCCH in subframe n-$k_m$, where $k_m \in K_I = \{7,6\}$, and static PUCCH resources for a PDSCH transmission indicated by the detection of a corresponding PDCCH in subframe n-$k_m$, where $k_m \in K_D = \{8,4\}$. The corresponding $K_A$ is defined so that it first takes the dynamic resource and then follows the static resource, i.e. $K_A \in \{K_I, K_D\} = \{7,6,8,4\}$.

In a fifth resource conflict resolution embodiment, a UE configured with dynamic TDD and with a PDSCH HARQ control timing configuration, i.e. a DL HARQ reference configuration, number different than the UL-DL configuration number given by the SIB is further configured with different PUCCH starting index $N_{PUCCH}^{(1)}$ than a UE not configured with dynamic TDD. With this embodiment, a UE configured with dynamic TDD different uses a dynamic PUCCH resources that is a different resource region than other UEs connected to the same cell.

In a sixth resource conflict resolution embodiment, UE, e.g. a dynamic UE, follows the PDSCH HARQ control timing and PUCCH resource according to the UL-DL configuration number given by SIB1 for a PDSCH transmission indicated by the detection of a PDCCH transmitted in the common search space or with a specific RNTI or on a specific ePDCCH set or using a specific DCI format. This embodiment ensures robust fall-back operations during reconfiguration periods. In some versions of this embodiment timing may also be different for uplink scheduling. In one example, one delay from received uplink grant to uplink data transmission may be calculated if scheduled on common search space and a different delay calculated if scheduled on UE specific search space. Timing could also depend on RNTI or on ePDCCH set or DCI format.

In a seventh resource conflict resolution embodiment, for a UE practicing the fifth resource conflict resolution embodiment, the network communicates to the UE during a reconfiguration period using a PDCCH transmitted in the common search space. The communication intends all communication that entails HARQ feedback. The common search space operation may therefore not change during reconfiguration and can hence be used until the new configuration is confirmed.

In an eighth resource conflict resolution embodiment, the UE is configured via higher-layer signaling to use semi-static PUCCH resources. Such configuration can be performed via the radio resource control (RRC) signaling messages.

In a ninth resource conflict resolution embodiment, the PF3 payload is determined by the size of set $K_R$ of the current subframe and the configured multi-antennas schemes, e.g. if one or two codewords are enabled within one subframe in the downlink. This ensures that the PF3 format has enough capacity to feed back all required HARQ feedback, i.e. HARQ feedback of subframe n-$k_m$, where $k_m \in K_R$.

As an example of this embodiment, consider the UE configured with UL-DL configuration 1 through SIB1 and DL reference configuration 3. In this configuration, the UE is further configured with a PDSCH HARQ control timing configuration number of 4. That is, the UE is configured with DL HARQ reference configuration number 4. The PF3 payload size for subframe n=2 is set according to the configured MIMO schemes and the set size of $K_R$={12,8,7,11}, i.e. 4.

This may be expressed as a payload size of the data by a size of a set $K_R$ of a current subframe and a configured multi-antenna scheme, wherein the set $K_R$ is defined as a number of corresponding previous subframes to be reported in the current subframe. In one example the previous subframes are part of a physical downlink shared channel. In the case of the device the device transmits the payload and in the case of the node the node received the payload.

In an tenth resource conflict resolution embodiment, the UE uses PF3 with a payload size determined according to the ninth resource conflict resolution if it feeds back HARQ feedback of a single PCell PDSCH transmission indicated by a PDCCH received in any subframe $n-k_m$, where $k_m \in K_D = K_R \backslash K$, i.e. the difference set of $K_R$ and $K$. Even though this is a single subframe assignment, no dynamic PUCCH Format 1a/b resources may be available on the PCell since subframes $n-k_m$, $k_m \in K_D$, don't report HARQ feedback according to the HARQ timing determined by the PCell UL-DL configuration.

There might be cases where a legacy UE would be configured with PF3 but only has HARQ feedback from one subframe. Such a legacy UE would normally use PUCCH Format 1a/b with dynamic mapping. But in this case we do not have a dynamic mapping for this subframe (since it is uplink for legacy UEs). It is thus proposed to use PF3 anyway even if it is only a single subframe to be reported.

In a eleventh resource conflict resolution embodiment, the UE operating according to resource conflict resolution embodiment six does not transmit any HARQ feedback on PUCCH for a transmission scheduled like described in embodiment six if the control timing maps to a subframe indicated as a downlink subframe by dynamic L1 signaling, where L1 signaling may be defined as DCI on PDCCH.

Advantages of the disclosed embodiments include resolution of PUCCH resource conflict within dynamic TDD capable UE.

Figure 19:
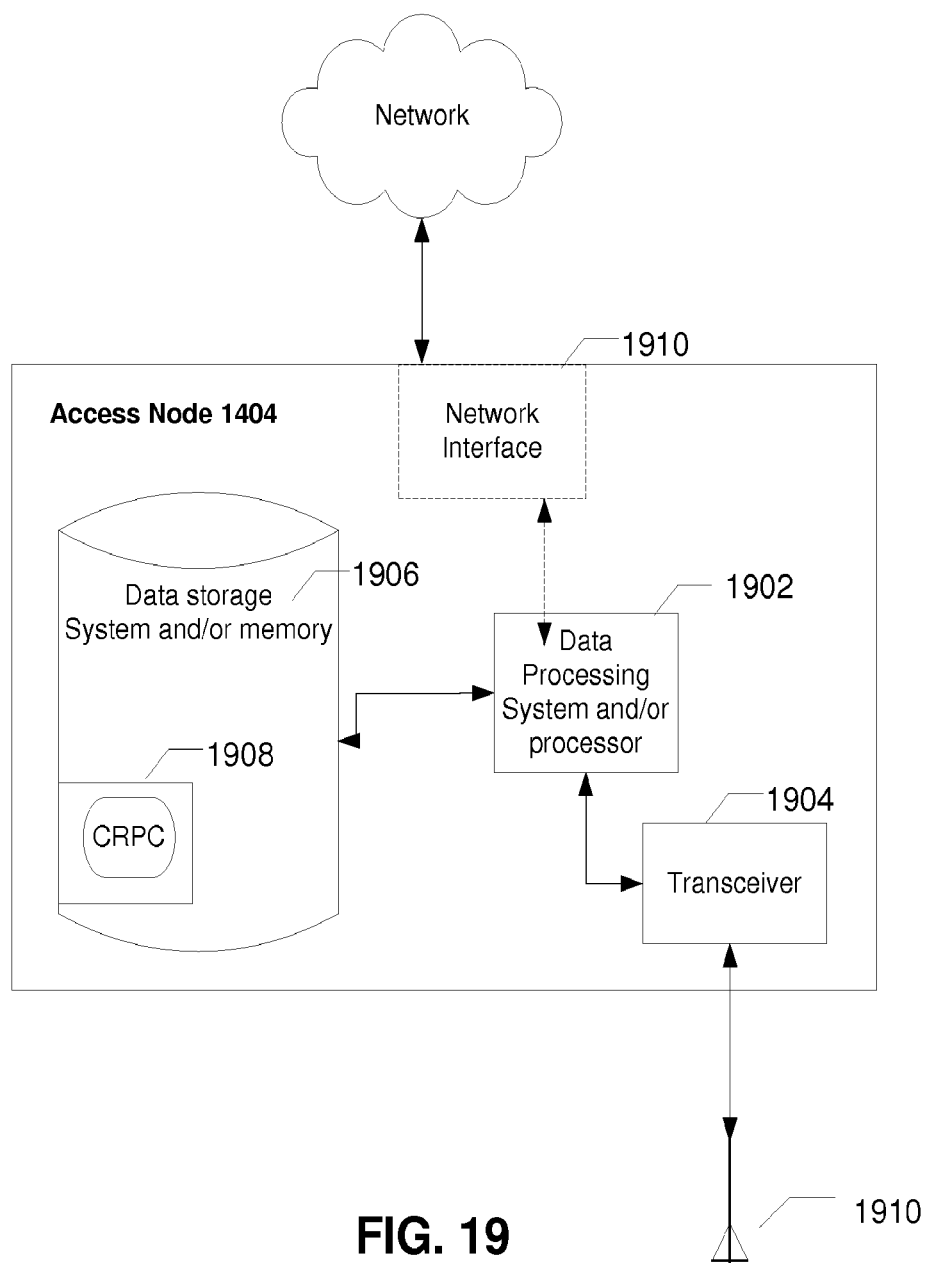
FIG. 19 illustrates a block diagram of an exemplary access node.

FIG. 19 illustrates a block diagram of an exemplary access node, such as node 1404 shown in FIG. 14. As shown in FIG. 19, the access node or node 1404 may include: a data processing system and/or processor 1902, which may include one or more microprocessors and/or one or more circuits, such as an application specific integrated circuit (ASIC), field-programmable gate arrays (FPGAs), and the like; a network interface 1910; a transceiver 1904, and a data storage system and/or memory 1906, which may include one or more non-volatile storage devices and/or one or more volatile storage devices (e.g., random access memory (RAM)). According to some embodiments, the data processing system 1902 may comprise a control unit used for selection of transmission parameters.

In embodiments where data processing system 1902 includes a microprocessor, computer readable program code (CRPC) 1908 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1902 to perform steps described above (e.g., steps described above with reference to the flow charts shown in FIGS. 15 and 17).

Accordingly, according to some embodiments a node is described as a node communicating or operable to communicate with a plurality of mobile devices and operating or operable in a cell in a communication network, the node comprising: a processor; a memory coupled to the processor; a network interface coupled to the processor; and a transceiver coupled to the network interface. The processor is configured to transmit, to a mobile device included in the plurality of mobile devices, a control message including first data transmission configuration. The processor is further configured to receive data from the mobile device in accordance with second data transmission configuration information determined from a set of configurations. In one embodiment an antenna is coupled to the transceiver configured to transmit and receive messages. Additional operations may be performed by the device or any component thereof to perform the steps, embodiments and or actions described herein.

Figure 20:
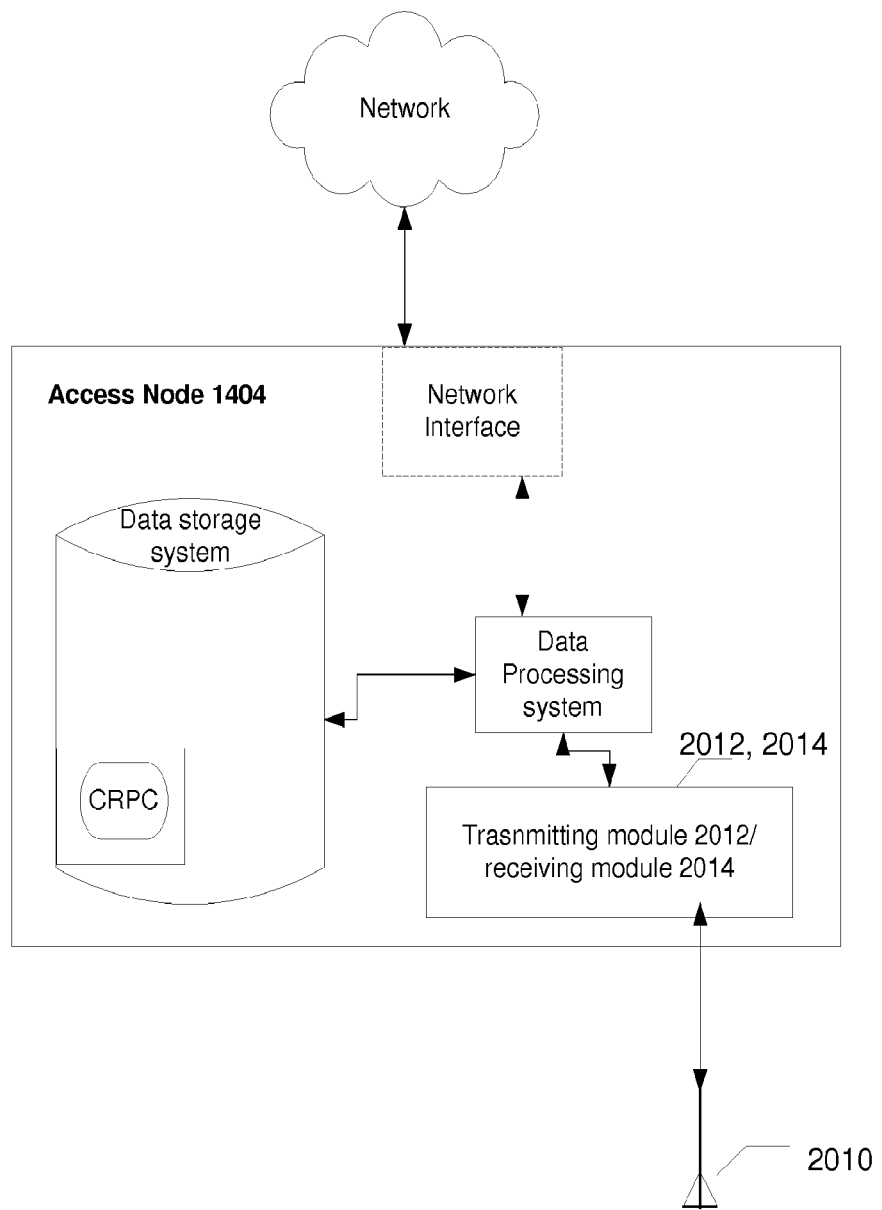
FIG. 20 illustrates a block diagram of an exemplary access node.

FIG. 20 provides a different view of the example node 1404, which in this case is represented with functional modules, including a transmitting module 2012 and a receiving module 2014. All or part of either or both of these modules may be implemented using a programmed processing circuit like that illustrated in FIG. 19, for example, alone or in combination with other hardware/circuitry. Thus, in some embodiments, the node 1404 comprises a transmitting module 2012, which is adapted transmitting, to a mobile device included in the plurality of mobile devices, a control message including first data transmission configuration. The node 1404 further comprises a receiving module 2014, receiving data from the mobile device in accordance with a second data transmission configuration determined from a set of configurations, wherein the set of configurations is associated with the first data transmission configuration information.

In other embodiments, the access node or node 1404 is configured to perform steps described herein without the need for code. That is, for example, data processing system 1902 may consist merely of one or more ASICs. Hence, the features of the embodiments described herein may be implemented in hardware and/or software. For example, in particular embodiments, the functional components of the base station described above may be implemented by data processing system 1902 executing computer instructions, by data processing system 1902 operating independent of any computer instructions, or by any suitable combination of hardware and/or software.

Figure 21:
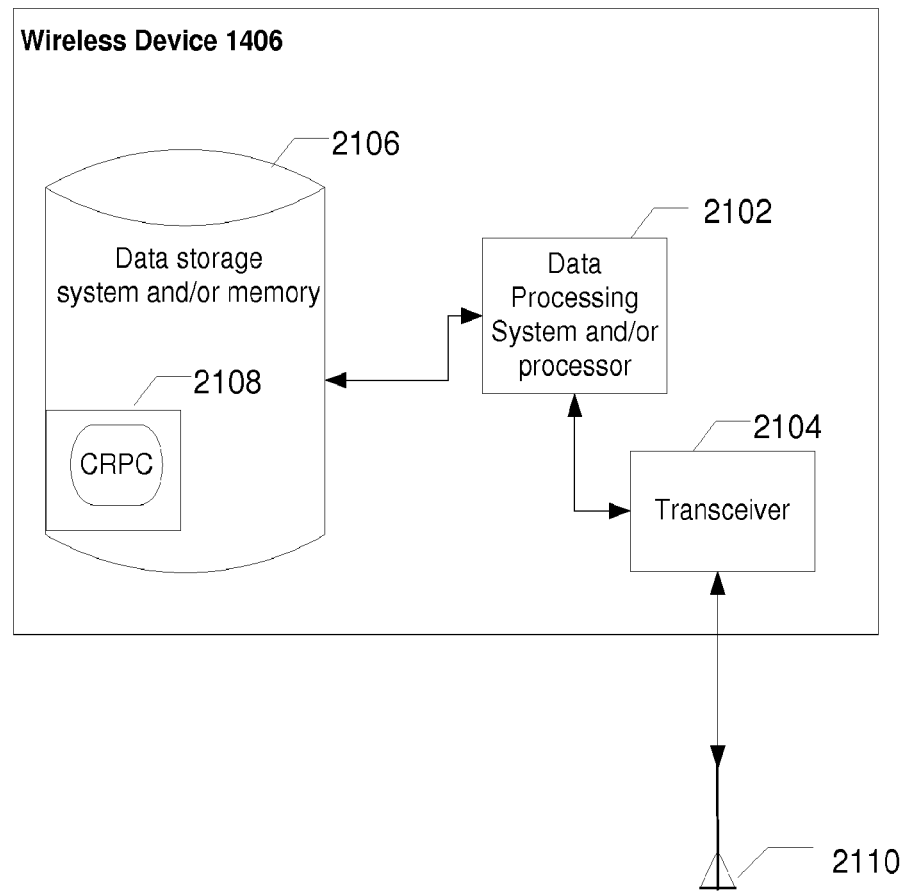
FIG. 21 illustrates a block diagram of an exemplary wireless device.

FIG. 21 illustrates a block diagram of an exemplary wireless device, such as device 1406 shown in FIG. 14. As shown in FIG. 21, the device 1406 may include: a data processing system and/or processor 2102, which may include one or more microprocessors and/or one or more circuits, such as an application specific integrated circuit (ASIC), field-programmable gate arrays (FPGAs), and the like; a transceiver 2104, and a data storage system and/or memory 2106, which may include one or more non-volatile storage devices and/or one or more volatile storage devices (e.g., random access memory (RAM)). According to some embodiments, the data processing system 2102 may comprise a control unit used for selection of transmission parameters.

In embodiments where data processing system 2102 includes a microprocessor, computer readable program code (CRPC) 2108 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 2102 to perform steps described above (e.g., steps described above with reference to the flow charts shown in FIGS. 15-17).

Accordingly, according to some embodiments a device 1406 is described as a device operable in a communication network to transmit messages to and receive messages from a base station over a half-duplex channel. The device comprises: a processor 2102; a memory 2106 coupled to the processor 2102; a transceiver 2104 coupled to the processor 2102; and an antenna 2110 coupled to the transceiver configured to transmit and receive messages. The processor 2102 is configured to receive a control message from the base station. The processor 2102 is further configured to determine a first data transmission configuration from the received control message. The processor 2102 is further configured determine a second data transmission configuration from a candidate set of configurations, wherein the candidate set is associated with the first data transmission configuration. The processor 2102 is further configured to transmit data to the base station in accordance with the second data transmission configuration. Additional operations may be performed by the device 1406 or any component thereof to perform the steps, embodiments and or actions described herein.

Figure 22:
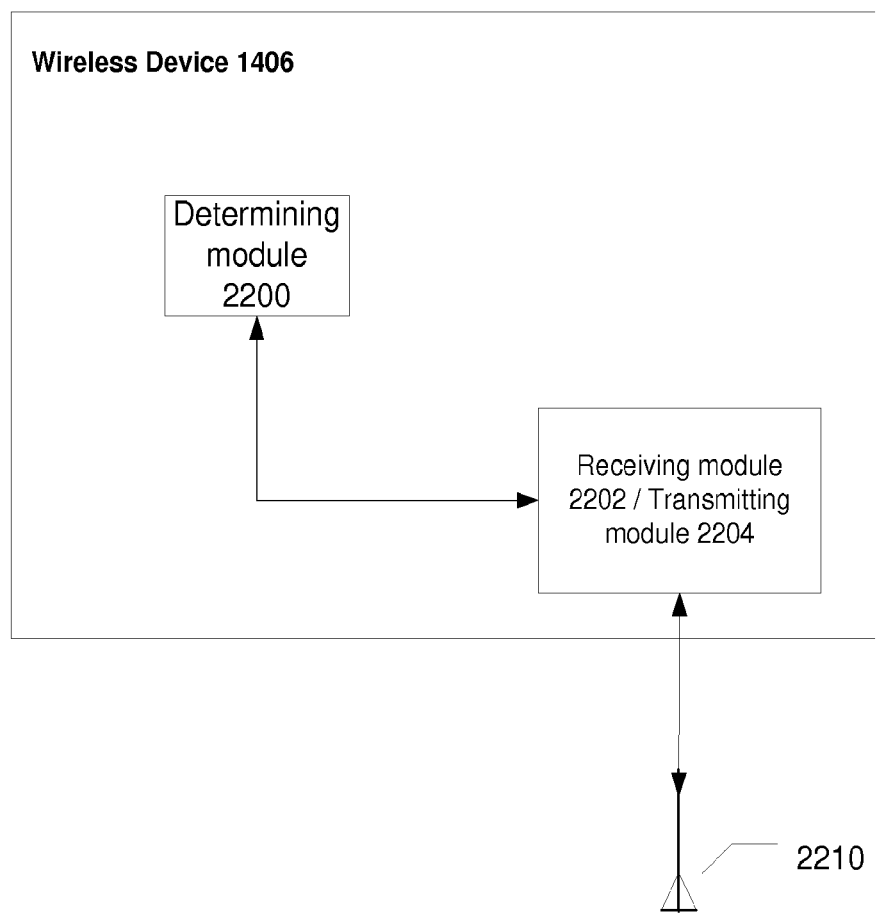
FIG. 22 illustrates a block diagram of an exemplary wireless device.

FIG. 22 provides a different view of the example device 1406, which in this case is represented with functional modules, including a receiving module 2202, a determining module 2200 and a transmitting module 2204. All or part of either or both of these modules may be implemented using a programmed processing circuit like that illustrated in FIG. 21, for example, alone or in combination with other hardware/circuitry. Thus, in some embodiments, device 1406 comprises a receiving module 2202 adapted to receive a control message from the base station. The device 1406 further comprises a determining module 2202, which is adapted to determine a first data transmission configuration from the received control message and also adapted to determine a second data transmission configuration from a candidate set of configurations, wherein the candidate set is associated with the first data transmission configuration. The device further comprises transmitting module 2204 which is adapted to transmit data to the base station in accordance with the second data transmission configuration.

In other embodiments, the device 1406 is configured to perform steps described herein without the need for code. That is, for example, data processing system 2102 may consist merely of one or more ASICs. Hence, the features of the embodiments described herein may be implemented in hardware and/or software. For example, in particular embodiments, the functional components of the base station described above may be implemented by data processing system 2102 executing computer instructions, by data processing system 2102 operating independent of any computer instructions, or by any suitable combination of hardware and/or software.

Figure 23:
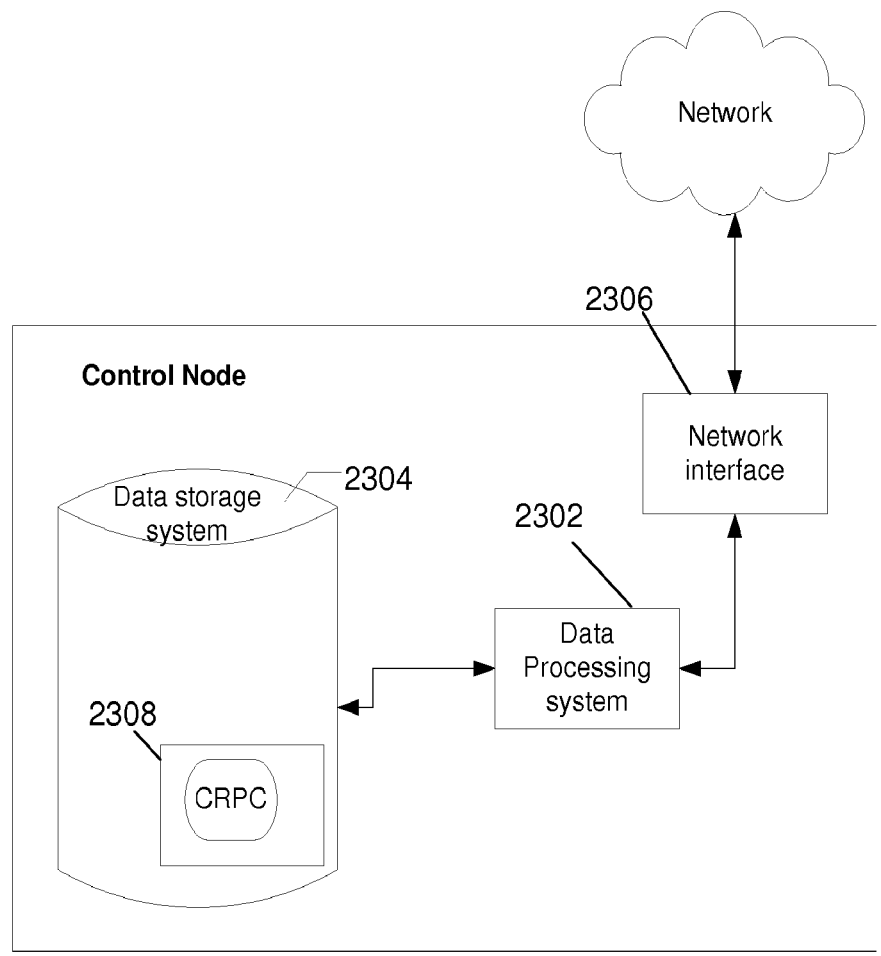
FIG. 23 illustrates a block diagram of an exemplary control node.

FIG. 23 illustrates a block diagram of an exemplary control node, such as node 1408 shown in FIG. 14. As shown in FIG. 23, the control node 1408 may include: a data processing system 2302, which may include one or more microprocessors and/or one or more circuits, such as an application specific integrated circuit (ASIC), field-programmable gate arrays (FPGAs), and the like; a network interface 2306, and a data storage system 2304, which may include one or more non-volatile storage devices and/or one or more volatile storage devices (e.g., random access memory (RAM)). According to some embodiments, the data processing system 2302 may comprise a control unit used for selection of transmission parameters. In embodiments where data processing system 2302 includes a microprocessor, computer readable program code (CRPC) 2308 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 2302 to perform steps described above (e.g., steps described above with reference to the flow charts shown in FIGS. 15-17). In other embodiments, the control node 1408 is configured to perform steps described herein without the need for code. That is, for example, data processing system 2302 may consist merely of one or more ASICs. Hence, the features of the embodiments described herein may be implemented in hardware and/or software. For example, in particular embodiments, the functional components of the base station described above may be implemented by data processing system 2302 executing computer instructions, by data processing system 2302 operating independent of any computer instructions, or by any suitable combination of hardware and/or software.

In the following variants and examples are discussed with respect to the embodiments described herein.

HARQ feedback and scheduling timing depends on the TDD configuration in order to make sure that feedback is always mapped to a subframe in the right direction. When introducing eIMTA, Enhanced Interference Mitigation & Traffic Adaptation, where a UE may change its assumption on subframe direction on a fast basis a way of handling this fast change and HARQ continuity is needed. In this contribution we define a simple and straightforward way to reuse existing standardized HARQ and scheduling timing. Also fallback operation is discussed, for managing operation during reconfiguration phases.

Discussion

With fast explicit signaling, HARQ and scheduling timing should not be associated with the explicit signaling due to robustness issues and limited benefits of doing so. Instead is a robust feedback and scheduling timing scheme needed to match all possible configurations.

HARQ timing can instead be inherited from the configurations, such as TDD configuration, by adopting dual reference configurations. This does not only significantly simplify specification but also make sure that sensitive HARQ feedback is only sent in subframes with a static direction within the system. This ensures that this feedback is protected from any cross link interference, relaxing the tight need for interference control.

With dual reference configurations the UE is configured to operate with two different TDD configurations at the same time, where one configuration is applied for uplink timing, such as PDCCH to PUSCH delay and PHICH timing, and a different configuration is used for downlink timing, such as PDSCH HARQ feedback delay. Most discussion on TDD timing in previous meetings has been on the HARQ timing but also the uplink scheduling timing, when to monitor for uplink grants and the delay between grant and transmission, is also dependent on the TDD configuration. In order to be able to schedule all uplink subframes without introducing new timing tables or complex dependencies on fast signaling the uplink scheduling may follow the uplink reference configuration.

Proposal 1: The uplink reference configuration determines the PDCCH monitoring for uplink grants, PDCCH to PUSCH delay and PUSCH to PHICH timing.

Proposal 2: The downlink reference configuration determines the PDSCH HARQ feedback timing.

Figure 24:
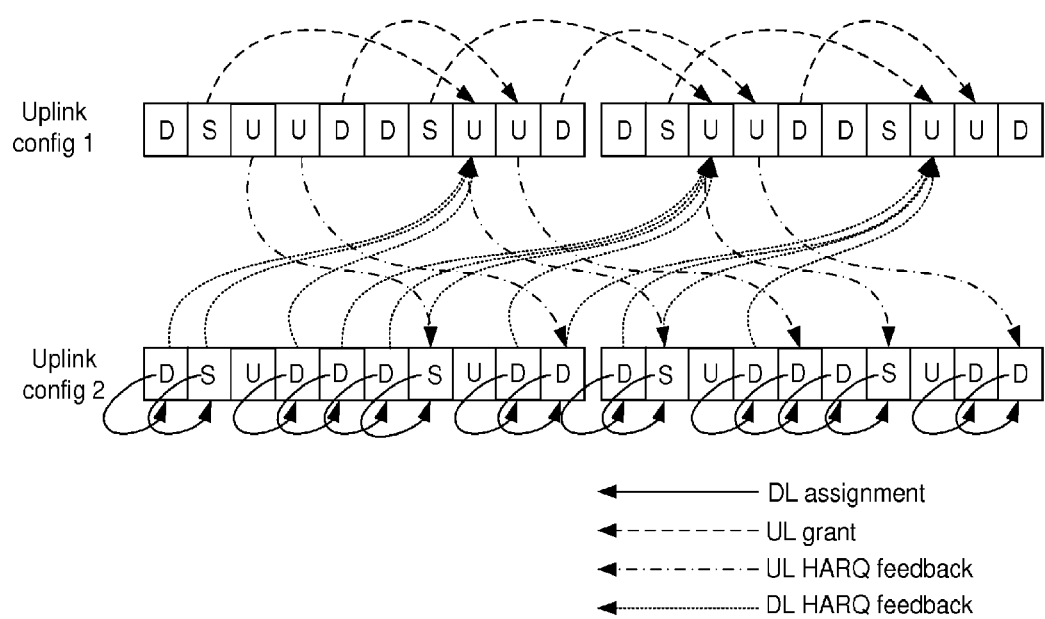
FIG. 24 illustrates an example of HARQ and scheduling timing inherited from carrier aggregation, scheduling flexible assign subframe 3 and 8 as uplink or downlink.

FIG. 24 illustrates an example of HARQ and scheduling timing inherited from carrier aggregation, scheduling flexible assign subframe 3 and 8 as uplink or downlink.

Some limitations exist to the configurations such as TDD configurations forming valid reference configurations and it also may put some restriction on the reconfiguration freedom for the fast adaptation. First must all downlink subframes in the uplink configuration also be downlink in the downlink reference configuration. The other way around must also be true, i.e. the uplink subframes in the downlink configuration must be uplink subframes in the uplink reference configurations. These conditions must also be met by any fast adaptation configuration. This implies that we form a number of fixed subframes, downlink subframes in uplink reference configurations and uplink subframes in downlink reference configurations, and a number of flexible subframes. Secondly will the HARQ RTT and delay be dependent on the configuration. Hence it is desirable to keep the number of flexible subframes high for best traffic adaptation as well as keeping the RTT down. This creates a tradeoff for the system dependent on situation.

For example if the uplink reference configuration is 0 we have a uplink round trip time of 13-14 ms while with configuration 1 we have a round trip of 10 ms. With configuration 1 we have two less flexible subframes. With configuration 2 as downlink reference we have a RTT of 10 ms while with configuration 5 RTT is 8-17 ms with the loss of 1 flexible subframe.

Signaling

In order to be able to determine the HARQ timing uplink and downlink reference timing is needed. If uplink reference configuration would be different from the configuration signalled in SIB1 the PHICH mapping would have to be modified, either by introducing a new (e)PHICH channel or by introducing PHICH less operation. The eNodeB would also have to puncture the beginning of the uplink frames in the reference configuration to send CRS according to legacy operation. At this point it is not clear that the added flexibility of having the uplink reference different from SIB1 configuration, enabling uplink data in MBSFN subframes, motivates the complexity introduced.

Proposal 3: The legacy TDD configuration, in SIB1, is applied as uplink reference configuration for single serving cell.

Proposal 4: The UE may assume that PDCCH is mapped according to the uplink reference configuration in subframes indicated as downlink in the uplink reference configuration.

For downlink reference configuration additional signalling is needed, this would act as the configuration activating the traffic adaptation.

Proposal 5: The downlink reference configuration is signaled by dedicated higher layer signaling.

Carrier Aggregation

The dual reference configuration may be extended to carrier aggregation where the downlink reference configuration is applied for PDSCH HARQ feedback mapping instead of the configuration signaled for the PCell. If the Scell is not utilizing eIMTA it would apply SIB1 signaled UL/DL configuration if the SCell has the same UL/DL configuration as the PCell reference configuration. If however the Pcell reference configuration is different from the Scells UL/DL configuration the SCell should apply a reference configurations that is based on the PCells reference configuration. If the SCell is utilizing eIMTA, the Scell can only apply an reference configuration that is compatible with the reference configuration on the Pcell.

PUCCH Resource Mapping

Since traffic adaptation implies that more subframes are useful for downlink transmission compared to the case of no traffic adaptation different resource mapping will be applied by a user or UE configured with the feature compared to one user or UE that do not apply the feature. For clarity, the feature discussed is the eIMTA discussed above. This creates a collision risk in the PUCCH resource mapping where two assignments may point to the same physical resource. A few potential solutions can be envisioned. PUCCH format 3 can directly be applied to both single cell and carrier aggregation cases. Encoding would then be done according to the downlink reference configuration of respective cell.

PUCCH Resource Mapping—Scheduler Collision Avoidance

The from the specification point of view the most straight forward solution is to leave the collision problem to the scheduler. This would put some restrictions on how to schedule legacy users together with new traffic adaptation activated users where some CCE combinations cannot both serve as initial CCE. Since the traffic adaptation feature mainly targets small cells and not extremely high loads search space limitations may be a limited problem and hence may it be a feasible solution.

PUCCH Resource Mapping—Separated PUCCH Resources

An option to guarantee that no limitations occur in the scheduler, that also simplify scheduler design, is to separate the PUCCH resource regions, for example by configuring different $N_{PUCCH}^{(1)}$ or by employing EPDCCH scheduling with different PUCCH mapping parameters. Together with some scheduler implementation this may be sufficient for effective operation. The drawback is an increase in PUCCH overhead.

PUCCH Resource Mapping—Updated Resource Mapping

If need is found that the complexity to scheduler implementation is too much and PUCCH overhead becomes too large for resource separation an optimized scheme for PUCCH resource mapping could be considered. For example the feedback mapping may be updated such that subframes present in uplink reference configurations "Downlink associations set" be mapped first according to the feedback mapping of the uplink reference configuration. Any remaining subframes in the "downlink association set" for the downlink reference configuration set may then be mapped according to the existing procedure, but offseted by the first mapping or mapped to configured resources.

TABLE 4

| UL/DL Configuration | Downlink association set index K: $\{k_0, k_1, \ldots, k_{M-1}\}$ for TDD Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |

TABLE 4-continued

Downlink association set index K: {k_0, k_1, ..., k_{M-1}} for TDD

| UL/DL Configuration | 0 | 1 | 2 | 3 | 4 | 5 | 6 | 7 | 8 | 9 |
|---|---|---|---|---|---|---|---|---|---|---|
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Proposal 6: Subframes present in both uplink and downlink reference configurations "Downlink association set" are mapped according to uplink reference configuration.

Fallback Operation

By not introducing any dependency between any fast physical layer signaling and the L1 scheduling timing the most sever and frequent problems requiring fallback operations is avoided. However some cases still occur if continues operation is to be supported. One example is during configuration/activation of the traffic adaptation feature. This may be dependent on RRC configuration and is hence connected with an ambiguity period from the eNodeBs perspective, after the RRC reconfiguration message is sent but before the RRC reconfiguration complete is received. During this period of time the eNodeB cannot know the PDSCH HARQ timing and PUCCH resource mapping employed by the UE. Two potential solutions exist. The eNodeB may try to blindly detect that the UE has updated its configuration by monitoring both possible HARQ feedback occasions, assuming there is no risk for collisions. Alternatively a fallback mode of operation could be introduced where PDSCH scheduled from common search space follow the HARQ feedback timing and PUCCH resource mapping indicated in SIB1, given that the subframe is downlink according to that configuration.

Proposal 7: The downlink reference configuration determines the PDSCH HARQ feedback timing only for data scheduled on UE specific search space.

DRX Operation

The arguments against introducing implicit signaling are the potentially increased power consumption in the terminal. The terminal power consumption is mainly related to the possibility to efficiently utilize terminal sleep and minimizing unnecessary transmissions. This is provided by commissioning DRX cycles to the UE. During DRX active periods all downlink subframes should be monitored, this would result in terminal power consumption on par with what would have been the case if the TDD configuration signaled in the SIB1 would have been the same as the downlink reference configuration. This is a minor increase in power that may very well be compensated with shorter active periods due to the throughput benefits of the dynamic TDD. However, the power increase during active time is in fact not a problem. During periods without data, modifications to the DRX rules could be designed such that only static downlink subframes needs to be monitored, this could in fact result in a much lower total power consumption compared to a static TDD configuration. Further evaluation of such schemes could be conducted by RAN2.

Observation 1: Further optimization to DRX could be considered by RAN2.

Transmission Modes and Channels

Except for the case of MBSFN subframe, the flexible subframes will not contain CRS in subframes when they are used as uplink. Therefore, an assumption is to not assume any CRS in these subframes at all. This would imply only supporting DM-RS based transmission modes and control channels, i.e. EPDCCH. EPDCCH is a choice since it was designed for presence detection in a way that the CRS based PDCCH was not, simplifying reuse in the UE.

One drawback with the DM-RS based transmission modes is the lack of cross subframe channel filtering. It should however be noted that the flexible subframes follows on uplink subframes where such filtering would anyway be less efficient.

Proposal 8: No CRS based transmissions are supported in flexible subframes.

Concise Description of Some Embodiments

A1. A method implemented in a device for preventing data transmission configuration conflict in a half-duplex channel between the device and a base station, the method comprising:
  receiving a control message from the base station;
  determining first data transmission configuration information from the received control message;
  selecting a second data transmission configuration information from a predetermined candidate set of configurations associated with the first data transmission configuration information; and
  transmitting data to the base station in accordance with the second data transmission configuration information.

A2. The method according to A1, wherein the device is a wireless communication device that is dynamic Time Division Capable (TDD).

A3. The method according to A2, wherein first and second data transmission configuration information is time division duplex (TDD) configuration information.

A4. The method according to A1, wherein the control message is a system information block.

A5. A method implemented in a device for preventing data transmission configuration conflict in a half-duplex channel between the device and a base station, the method comprising:
  determining a predetermined transmission timing of transmission of first data transmission configuration information from the base station;
  determining whether the device detected the transmission of the first data transmission configuration information at the predetermined transmission timing;
  transmitting data to the base station in accordance with the first data transmission configuration information upon determination that the device detected the transmission of the first data transmission configuration information at the predetermined transmission timing; and transmitting data to the base station in accordance with second data transmission configuration upon determination that the device did not detect the transmission of the first data transmission configuration information at the predetermined transmission timing, the second data transmission configuration information included in a control message transmitted from the base station.

A6. The method according to A5, wherein the device is a wireless communication device that is dynamic Time Division Capable (TDD).

A7. The method according to A6, wherein first and second data transmission configuration information is time division duplex (TDD) configuration information.

A8. The method according to A5, wherein the first data transmission configuration information is included in explicit signaling from the base station.

A9. The method according to A5, wherein the control message is a system information block.

A10. A device operable in a communication network to transmit messages to and receive messages from a base station over a half-duplex channel, the device comprising:
    a processor;
    a memory coupled to the processor;
    a transceiver coupled to the processor; and
    an antenna coupled to the transceiver configured to transmit and receive messages,
    wherein the processor is configured to:
    receive a control message from the base station,
    determine first data transmission configuration information from the received control message,
    select a second data transmission configuration information from a predetermined candidate set of configurations associated with the first data transmission configuration information, and
    transmit data to the base station in accordance with the second data transmission configuration information.

A11. The device according to A10, wherein the device is a wireless communication device that is dynamic Time Division Capable (TDD).

A12. The method according to A11, wherein first and second data transmission configuration information is time division duplex (TDD) configuration information.

A13. The device according to A10, wherein the control message is a system information block.

A14. A device operable in a communication network to transmit messages to and receive messages from a base station over a half-duplex channel, the device comprising:
    a processor;
    a memory coupled to the processor;
    a transceiver coupled to the processor; and
    an antenna coupled to the transceiver configured to transmit and receive messages,
    wherein the processor is configured to:
    determine a predetermined transmission timing of transmission of first data transmission configuration information from the base station,
    determine whether the device detected the transmission of the first data transmission configuration information at the predetermined transmission timing,
    transmit data to the base station in accordance with first data transmission configuration information upon determination that the device detected the transmission of the first data transmission configuration information at the predetermined transmission timing, and transmit data to the base station in accordance with second data transmission configuration upon determination that the device did not detect the transmission of the first data transmission configuration information at the predetermined transmission timing, the second data transmission configuration information included in a control message transmitted from the base station.

A15. The device according to A14, wherein the device is a wireless communication device that is dynamic Time Division Capable (TDD).

A16. The device according to A15, wherein first and second data transmission configuration information is time division duplex (TDD) configuration information.

A17. The device according to A14, wherein the first data transmission configuration information is included in explicit signaling from the base station.

A18. The device according to A14, wherein the control message is a system information block.

A19. A node communicating with a plurality of mobile devices and operating in a cell in a communication network, the node comprising:
    a processor;
    a memory coupled to the processor;
    a network interface coupled to the processor;
    a transceiver coupled to the network interface; and
    an antenna coupled to the transceiver configured to transmit and receive messages;
    wherein the processor is configured to:
    transmit, to a mobile device included in the plurality of mobile devices, a control message including first data transmission configuration information, and
    receive data from the mobile device in accordance with second data transmission configuration information selected from a predetermined set of configurations associated with the first data transmission configuration information.

A20. The node according to A19, wherein first and second data transmission configuration information is time division duplex (TDD) configuration information.

A21. The node according to A19, wherein the control message is a system information block.

A22. A node communicating with a plurality of mobile devices and operating in a cell in a communication network, the node comprising:
    a processor;
    a memory coupled to the processor;
    a network interface coupled to the processor;
    a transceiver coupled to the network interface; and
    an antenna coupled to the transceiver configured to transmit and receive messages;
    wherein the processor is configured to:
    transmit, at a predetermined transmission timing to a mobile device included in the plurality of mobile devices, first data transmission configuration information from the base station,
    receive data from the mobile device in accordance with the first data transmission configuration information if the mobile device detected the transmission of the first data transmission configuration information at the predetermined transmission timing, and
    if the mobile device did not detect the transmission of the first data transmission configuration information at the predetermined transmission timing,
    transmit a control message including second data transmission configuration information, and receive data from the mobile device in accordance with the second data transmission configuration information.

A23. The node according to A22, wherein first and second data transmission configuration information is time division duplex (TDD) configuration information.

A24. The node according to A22, wherein the first data transmission configuration information is included in explicit signaling from the node.

A25. The device according to A22, wherein the control message is a system information block.

Additional Discussion on Technically Related Technology

In some embodiments, the PDCCH is used to carry downlink control information (DCI) such as scheduling decisions and power-control commands. More specifically, the DCI includes:

Downlink scheduling assignments, including PDSCH resource indication, transport format, hybrid-ARQ information, and control information related to spatial multiplexing (if applicable). A downlink scheduling assignment also includes a command for power control of the PUCCH used for transmission of hybrid-ARQ acknowledgements in response to downlink scheduling assignments.

Uplink scheduling grants, including PUSCH resource indication, transport format, and hybrid-ARQ-related information. An uplink scheduling grant also includes a command for power control of the PUSCH.

Power-control commands for a set of terminals as a complement to the commands included in the scheduling assignments/grants.

One PDCCH carries one DCI message with one of the formats above. As multiple terminals can be scheduled simultaneously, on both the downlink and uplink transmissions, there is a possibility to transmit multiple scheduling messages within each subframe. Each scheduling message is transmitted on a separate PDCCH, and consequently there are typically multiple simultaneous PDCCH transmissions within each cell. Furthermore, to support different radio-channel conditions, link adaptation can be used, where the code rate of the PDCCH is selected to match the radio-channel conditions.

To allow for simple yet efficient processing of the control channels in the terminal, in some embodiments, the mapping of PDCCHs to resource elements is subject to a certain structure. This structure is based on Control-Channel Elements (CCEs), which consists of nine REGs. The number of CCEs, one, two, four, or eight, required for a certain PDCCH depends on the payload size of the control information (DCI payload) and the channel-coding rate. This is used to realize link adaptation for the PDCCH; if the channel conditions for the terminal to which the PDCCH is intended are disadvantageous, a larger number of CCEs needs to be used compared to the case of advantageous channel conditions. The number of CCEs used for a PDCCH is also referred to as the aggregation level (AL).

In some embodiments, the network can then select different aggregation levels and PDCCH positions for different UEs from the available PDCCH resources. For each PDCCH, as illustrated in FIG. 4, a CRC is attached to each DCI message payload. The identity of the terminal (or terminals) addressed—that is, the RNTI—is included in the CRC calculation and not explicitly transmitted. Depending on the purpose of the DCI message (unicast data transmission, power-control command, random-access response, etc.), different RNTIs are used. For normal unicast data transmission, the terminal-specific C-RNTI is used. After CRC attachment, the bits are coded with a rate-1/3 tail-biting convolutional code and ratematched to fit the amount of resources used for PDCCH transmission. After the PDCCHs to be transmitted in a given subframe have been allocated to the desired resource elements (the details of which are given below), the sequence of bits corresponding to all the PDCCH resource elements to be transmitted in the subframe, including the unused resource elements, is scrambled by a cell- and subframe-specific scrambling sequence to randomize inter-cell interference, followed by QPSK modulation and mapping to resource elements. The entire collection of the REGs (including those unused by any PDCCH) is then interleaved across entire control region to randomize inter-cell interference as well as capturing frequency diversity for the PDCCHs.

In some embodiments, LTE defines search spaces that describe the set of CCEs the terminal is supposed to monitor for scheduling assignments/grants relating to a certain component carrier. According to some embodiments, a search space is a set of candidate control channels formed by CCEs on a given aggregation level, which the terminal is supposed to attempt to decode. As there are multiple aggregation levels, corresponding to one, two, four, and eight CCEs, a terminal has multiple search spaces. In each subframe, the terminals will attempt to decode all the PDCCHs that can be formed from the CCEs in each of its search spaces. If the CRC checks, the content of the control channel is declared as valid for this terminal and the terminal processes the information (scheduling assignment, scheduling grants, etc.). Each terminal in the system therefore has a terminal-specific search space at each aggregation level.

In several situations, there is a need to address a group of, or all, terminals in the system. To allow all terminals to be addressed at the same time, LTE has defined common search spaces in addition to the terminal-specific search spaces. A common search space is, as the name implies, common, and all terminals in the cell monitor the CCEs in the common search spaces for control information. Although the motivation for the common search space is primarily transmission of various system messages, it can be used to schedule individual terminals as well. Thus, it can be used to resolve situations where scheduling of one terminal is blocked due to lack of available resources in the terminal-specific search space. More important, the common search space is not dependent of UE configuration status. Therefore, the common search space can be used when the NW needs communicate with the UE during UE reconfiguration periods.

Figure 5:
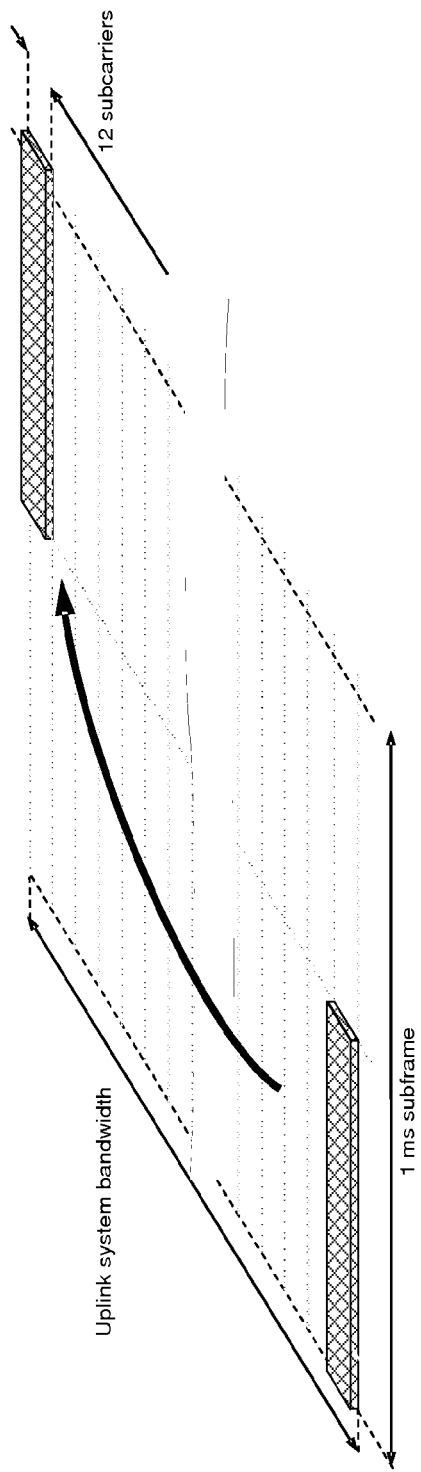
FIG. 5 illustrates exemplary Uplink L1/L2 control signaling transmission on Rel-8 PUCCH.

If the mobile terminal has not been assigned an uplink resource for data transmission, the L1/L2 control information (channel-status reports, hybrid-ARQ acknowledgments, and scheduling requests) is transmitted in uplink resources (resource blocks) specifically assigned for uplink L1/L2 control on Rel-8 PUCCH. As illustrated in FIG. 5, these resources are located at the edges of the total available cell bandwidth. Each such resource consists of 12 "subcarriers" (one resource block) within each of the two slots of an uplink subframe. In order to provide frequency diversity, these frequency resources are frequency hopping on the slot boundary, i.e. one "resource" consists of 12 subcarriers at the upper part of the spectrum within the first slot of a subframe and an equally sized resource at the lower part of the spectrum during the second slot of the subframe or vice versa. If more resources are needed for the uplink L1/L2 control signaling, e.g. in case of very large overall transmission bandwidth supporting a large number of users, additional resources blocks can be assigned next to the previously assigned resource blocks.

The LTE Rel-10 standard has recently been standardized, supporting bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of Carrier Aggregation (CA). CA implies that an LTE Rel-10 terminal can receive multiple CC, where the CC have, or at least the possibility to have, the same structure as a Rel-8 carrier.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal: A terminal may for example support more downlink CCs than uplink CCs, even though the cell is configured with the same number of uplink and downlink CCs.

During initial access a LTE Rel-10 terminal behaves similar to a LTE Rel-8 terminal. Upon successful connection to the network a terminal may—depending on its own capabilities and the network—be configured with additional CCs in the UL and DL. Configuration is based on RRC. Due to the heavy signaling and rather slow speed of RRC signaling, a terminal may be configured with multiple CCs even though not all of them are currently used. If a terminal is configured on multiple CCs, this results in monitoring all DL CCs for PDCCH and PDSCH. This results a wider receiver bandwidth, higher sampling rates, etc. resulting in high power consumption.

To mitigate the above described problems, LTE Rel-10 supports activation of CCs on top of configuration. The terminal monitors only configured and activated CCs for PDCCH and PDSCH. Since activation is based on Medium Access Control (MAC) control elements—which are faster than RRC signaling—activation/de-activation can follow the number of CCs that is required to fulfill the current data rate needs. Upon arrival of large data amounts multiple CCs are activated, used for data transmission, and de-activated if not needed anymore. All but one CC—the DL Primary CC (DL PCC)—can be de-activated. Activation provides therefore the possibility to configure multiple CC but only activate them on a need basis. Most of the time a terminal would have one or very few CCs activated resulting in a lower reception bandwidth and thus battery consumption.

Scheduling of a CC is done on the PDCCH via downlink assignments. Control information on the PDCCH is formatted as a Down/ink Control Information (DCI) message. In Rel-8 a terminal only operates with one DL and one UL CC, the association between DL assignment, UL grants and the corresponding DL and UL CCs is therefore clear. In Rel-10 two modes of CA needs to be distinguished: The first case is very similar to the operation of multiple Rel-8 terminals, a DL assignment or UL grant contained in a DCI message transmitted on a CC is either valid for the DL CC itself or for associated (either via cell-specific or UE specific linking) UL CC. A second mode of operation augments a DCI message with the Carrier Indicator Field (CIF). A DCI containing a DL assignment with CIF is valid for that DL CC indicted with CIF and a DCI containing an UL grant with CIF is valid for the indicated UL CC.

DCI messages for downlink assignments contain among others resource block assignment, modulation and coding scheme related parameters, HARQ redundancy version, etc. In addition to those parameters that relate to the actual downlink transmission most DCI formats for downlink assignments also contain a bit field for Transmit Power Control (TPC) commands. These TPC commands are used to control the uplink power control behavior of the corresponding PUCCH that is used to transmit the HARQ feedback.

In Rel-10 LTE, the transmission of PUCCH is mapped onto one specific uplink CC, the UL Primary CC (UL PCC). Terminals only configured with a single DL CC (which is then the DL PCC) and UL CC (which is then the UL PCC) are operating dynamic ACK/NACK on PUCCH according to Rel-8. The first Control Channel Element (CCE) used to transmit PDCCH for the DL assignment determines the dynamic ACK/NACK resource on Rel-8 PUCCH. Since only one DL CC is cell-specifically linked with the UL PCC no PUCCH collisions can occur since all PDCCH are transmitted using different first CCE.

Upon reception of DL assignments on a single Secondary CC (SCC) or reception of multiple DL assignments, CA PUCCH should be used. A DL SCC assignment alone is untypical. The eNB scheduler should strive to schedule a single DL CC assignment on the DL PCC and try to de-activate SCCs if not needed. A possible scenario that may occur is that eNB schedules terminal on multiple DL CCs including the PCC. If the terminal misses all but the DL PCC assignment it will use Rel-8 PUCCH instead of CA PUCCH. To detect this error case eNB has to monitor both the Rel-8 PUCCH and the CA PUCCH.

In Rel-10 LTE, the CA PUCCH format is based on the number of configured CC. Configuration of CC is based on RRC signaling. After successful reception/application of the new configuration a confirmation message is sent back making RRC signaling very safe.

Figure 6:
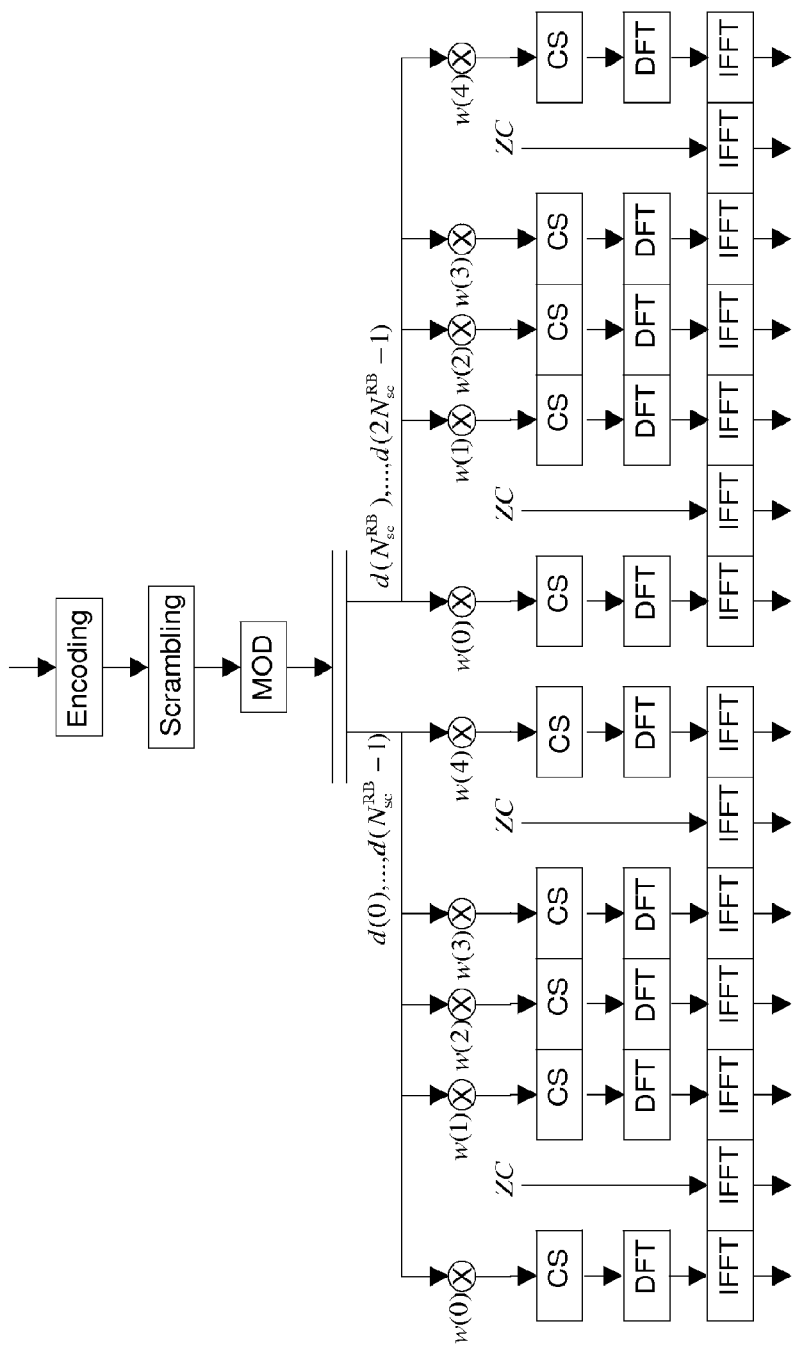
FIG. 6 is an exemplary illustration of DFT-S-OFDM based PUCCH Format 3 for UE supporting more than 4 HARQ bits in normal CP subframes.

The CA PUCCH can be done with two different ways. The first method is based on the use of PUCCH format 3 that is based on DFTS-OFDM. FIG. 6 shows a block diagram of that design in which one slot is shown. The multiple ACK/NACK bits are encoded to form 48 coded bits. The coded bits are then scrambled with cell-specific (and possibly DFTS-OFDM symbol dependent) sequences. 24 bits are transmitted within the first slot and the other 24 bits are transmitted within the second slot. The 24 bits per slot are converted into 12 QPSK symbols, DFT precoded, spread across five DFTS-OFDM symbols and transmitted within one resource blocks (bandwidth) and five DFTS-OFDM symbols (time). The spreading sequence oc is UE specific and enables multiplexing of up to five users within the same resource blocks.

For the reference signals cyclic shifted CAZAC sequences, e.g. the computer optimized sequences as disclosed in the publication 3GPP 36.211 Release 11, the entire contents of which are incorporated herein by reference.

Figure 7:
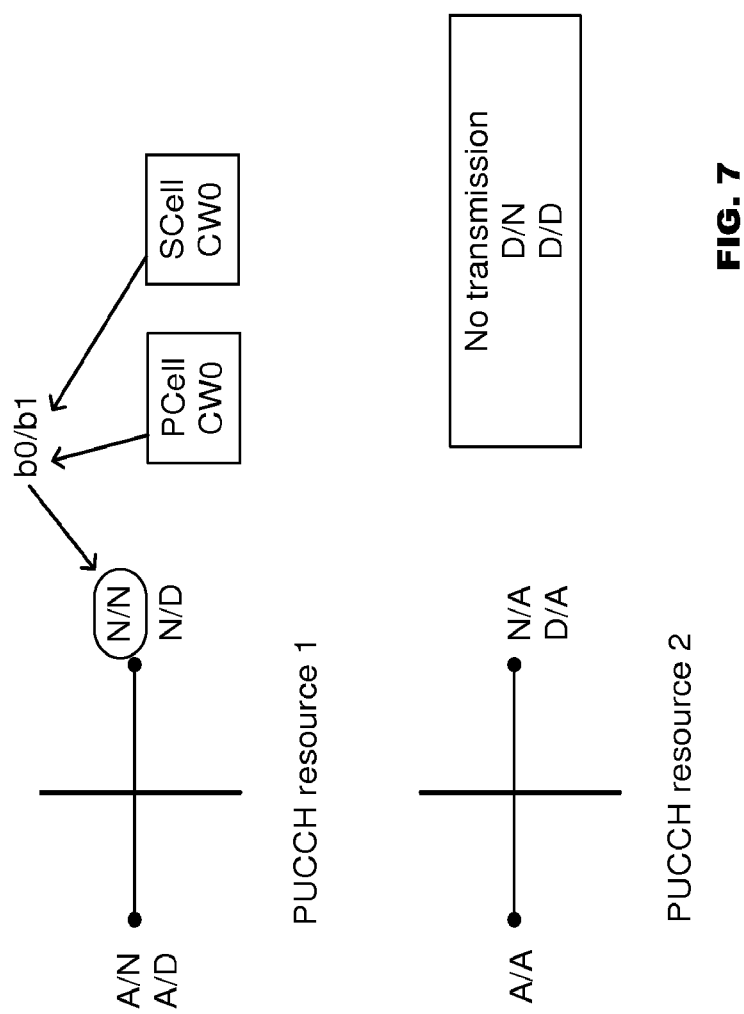
FIG. 7 is an exemplary illustration of mapping of format 1 b with channel selection for 2 A/N bits.
Figure 8:
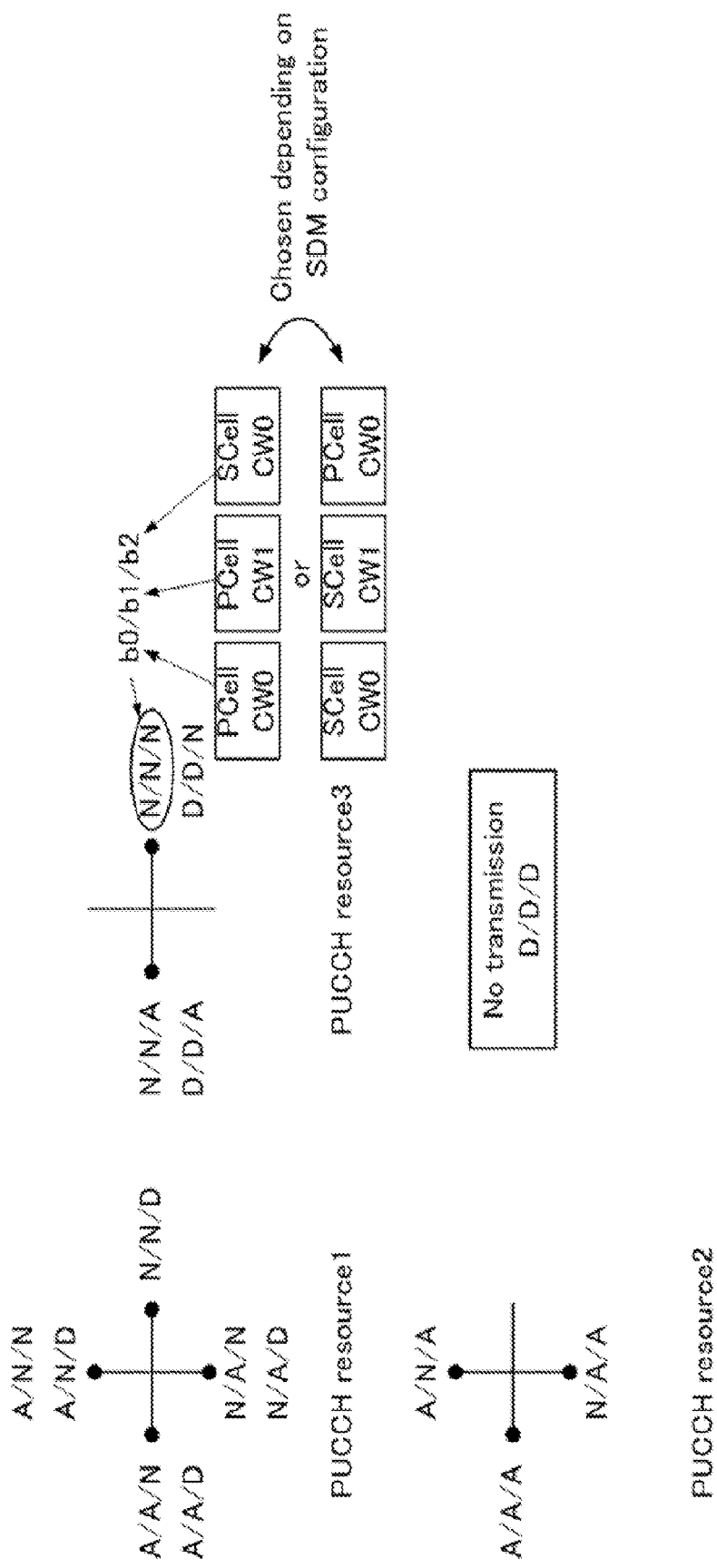
FIG. 8 is an exemplary illustration of mapping of format 1 b with channel selection for 3 A/N bits.
Figure 9:
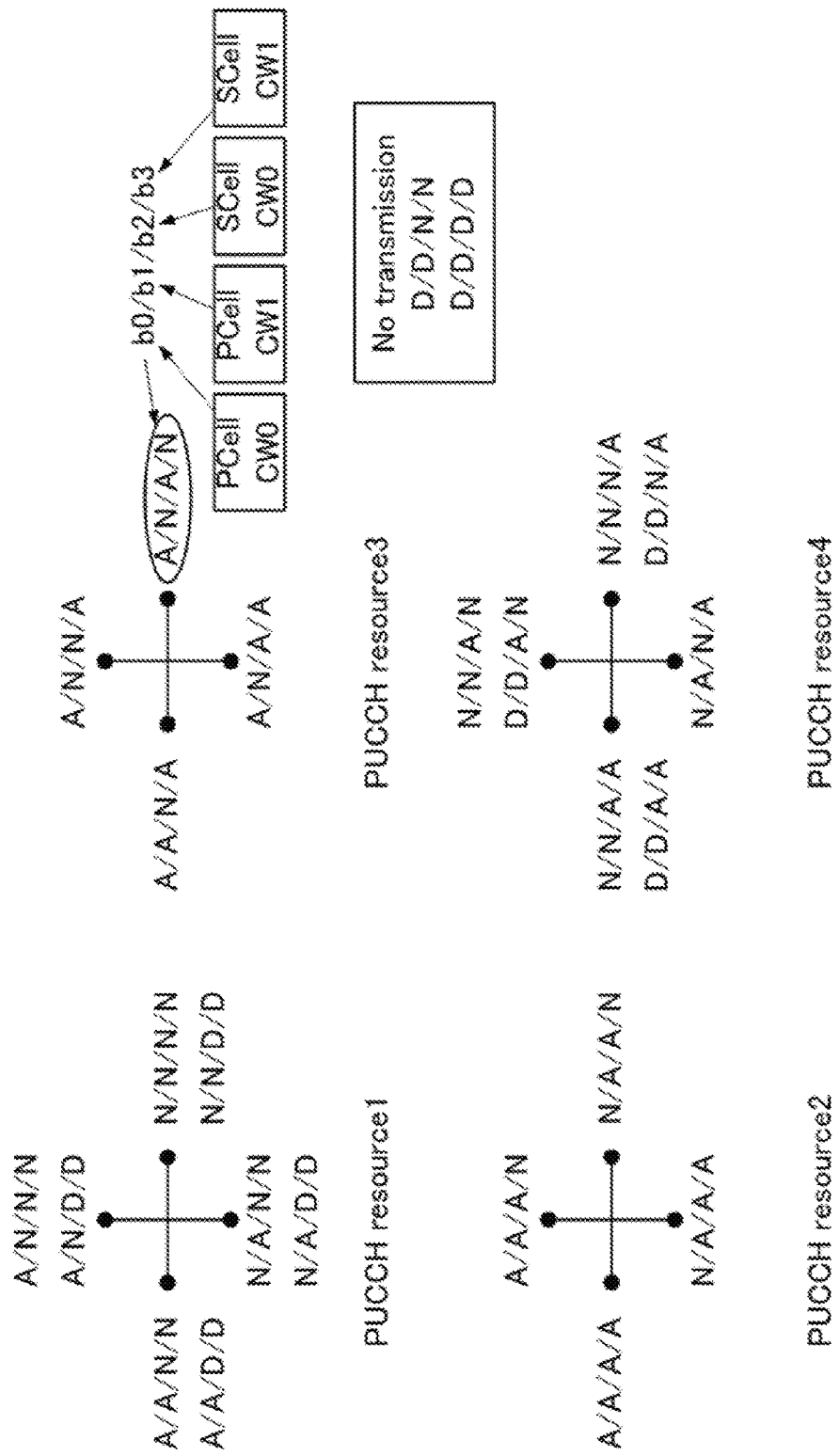
FIG. 9 is an exemplary illustration of mapping of format 1 b with channel selection for 4 A/N bits.

The second CA PUCCH method is called channel selection. The basic principle is that the UE is assigned a set of PUCCH format 1a/1b resources. The UE then selects one of resources according to the ACK/NACK sequence the UE should transmit. On one of the assigned resource the UE would then transmit a QPSK or BPSK. The eNB detect which resource the UE uses and which QPSK or BPSK value the UE fed back on the used resource and combines this into a HARQ response for associated DL cells. The mapping of ACK (A), NACK (N) and DTX (D) is according to FIG. 7, FIG. 8 and FIG. 9 for FDD. A similar type of mapping including a bundling approach is also done for TDD in case the UE is configured with channel selection.

Abbreviations
3GPP 3rd Generation Partnership Project
ACK Acknowledgement
CC Chase combining
CQI Channel Quality Information
CRC Cyclic redundancy check
D-CPICH Demodulation (dedicated) Common Pilot Channel
DL Downlink
E-TFCI Enhanced TFCI
GSM Global System for Mobile Communications
HARQ Hybrid automatic repeat request
HSDPA High Speed Downlink Packet Access
HS-DPCCH High Speed dedicated physical common control channel
HSPA High Speed Packet Access
HS-PDSCH High speed Physical data shared channel
HS-SCCH High Speed Shared Control Channel
IR Incremental Redundancy
LPN Low Power Node
LTE Long Term Evolution
MIMO Multiple-Input Multiple-Out-put
MMSE Minimum Mean Square Error
NAK Non-acknowledgement
PDCCH Physical Downlink Control Channel
PDSCH Physical Downlink Shared Channel
PUCCH Physical Uplink Control Channel
PCI Precoding control index
P-CPICH Primary Common Pilot Channel
RAM Random Access Memory
ROM Read Only Memory
SIB System Information Block
SIMO Single input multiple output
TDD Time Division Duplex
TFCI Transmit Format Combination Indicator
TTI Transmit Time Interval
Tx Transmitter
UE User Equipment
UL Up Link
USB Universal Serial Bus
WCDMA Wideband Code Division Multiple Access
WiMax Worldwide Interoperability for Microwave Access
H-RNTI High Speed Radio Network Temporary Identifier
RND Radio Network Controller
TB Transport Block
ID Identifier
W Watt In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that, although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A method for a device for preventing data transmission configuration conflict between the device and a base station, the method comprising:
   receiving a control message from the base station, the control message comprising a first data transmission configuration information;
   determining a predetermined transmission timing of transmission of a second data transmission configuration information;
   determining whether the second data transmission configuration information was received at the predetermined transmission timing;
   determining a third data transmission configuration based on the determination whether the second transmission configuration information was received at the predetermined transmission timing, such that, if the second transmission configuration information was received at the predetermined transmission timing, then determining the third data transmission configuration from a candidate set of configurations associated with the second data transmission configuration information, otherwise determining the third data transmission configuration from a candidate set of configurations associated with the first data transmission configuration information; and
   transmitting data to the base station in accordance with the third data transmission configuration.

2. The method according to claim 1, wherein the third data transmission configuration is a downlink hybrid automatic repeat request reference configuration.

3. The method according to claim 2, wherein the downlink hybrid automatic repeat request reference configuration is the same for all dynamic time division duplex capable devices.

4. The method according to claim 1, wherein the data comprises hybrid automatic repeat request feedback.

5. The method according to claim 4, wherein the hybrid automatic repeat request feedback is transmitted using physical uplink control channel format 3.

6. The method according to claim 1, further comprising determining a payload size of the data by a size of a set of a current subframe and a configured multi-antenna scheme, wherein the set is defined as a number of corresponding previous subframes to be reported in the current subframe.

7. The method according to claim 6, wherein the previous subframes are part of a physical downlink shared channel.

8. The method according to claim 1, wherein the device is a wireless communication device that is dynamic Time Division Duplex capable.

9. The method according to claim 1, wherein the first data transmission configuration information is a first time division duplex configuration information and the second data transmission configuration information is a second time division duplex configuration information.

10. The method according to claim 1, wherein the control message is a system information block message, and wherein the second data transmission configuration information is included in an explicit signaling from the base station.

11. A device operable in a communication network to transmit messages to and receive messages from a base station over a half-duplex channel, the device comprising:
   a processor;
   a memory coupled to the processor;
   a transceiver coupled to the processor; and
   an antenna, coupled to the transceiver, configured to transmit and receive messages,
   wherein the processor is configured to:
      receive a control message from the base station, the control message comprising a first data transmission configuration information;
      determine a predetermined transmission timing of transmission of a second data transmission configuration information,
      determine whether the second data transmission configuration information was received at the predetermined transmission timing;
      determine a third data transmission configuration based on the determination whether the second transmission configuration information was received at the predetermined transmission timing, such that, if the second transmission configuration information was received at the predetermined transmission timing, then the processor is configured to determine the third data transmission configuration from a candidate set of configurations associated with the second data transmission configuration information, otherwise the processor is configured to determine the third data transmission configuration from a candidate set of configurations associated with the first data transmission configuration information, and transmit data to the base station in accordance with the third data transmission configuration.

12. The device according to claim 11, wherein the third data transmission configuration is a downlink hybrid automatic repeat request reference configuration.

13. The device according to claim 12, wherein the downlink hybrid automatic repeat request reference configuration is the same for all dynamic time division duplex capable devices.

14. The device according to claim 11, wherein the data comprises hybrid automatic repeat request feedback.

15. The device according to claim 14, wherein the hybrid automatic repeat request feedback is transmitted using physical uplink control channel format 3.

16. The device according to claim 11, wherein the processor is further configured to determine a payload size of the data by a size of a set of a current subframe and a configured multi-antenna scheme, and wherein the set is defined as a number of corresponding previous subframes to be reported in the current subframe.

17. The device according to claim 16, wherein the previous subframes are part of a physical downlink shared channel.

18. The device according to claim 11, wherein the device is a wireless communication device that is dynamic time division duplex capable.

19. The device according to claim 11, wherein the first data transmission configuration information is a first time division duplex configuration information and the second data transmission configuration information is a second time division duplex configuration information.

20. The device according to claim 11, wherein the control message is a system information block message, and wherein the second data transmission configuration information is included in an explicit signaling from the base station.

21. A method for a node communicating with a plurality of mobile devices, the method comprising:
transmitting, to a mobile device included in the plurality of mobile devices, a control message comprising a first data transmission configuration information;
transmitting, to the mobile device, a second data transmission configuration information at a predetermined transmission time; and
receiving data from the mobile device in accordance with a third data transmission configuration determined from a set of configurations, wherein the third data transmission configuration is determined, such that, if the mobile device received the second data transmission configuration information at the predetermined transmission time, then the set of configurations is associated with the second data transmission configuration information, otherwise the set of configurations is associated with the first data transmission configuration information.

22. The method of claim 21, wherein the third data transmission configuration is a downlink hybrid automatic repeat request reference configuration.

23. The method of claim 22, wherein the downlink hybrid automatic repeat request reference configuration is the same for all dynamic time division duplex capable mobile devices of the plurality of mobile devices.

24. The method of claim 21, wherein the data comprises hybrid automatic repeat request feedback.

25. The method of claim 24, wherein the hybrid automatic repeat request feedback is received using physical uplink control channel format 3.

26. The method of claim 21, wherein the data has a payload size based on a size of a set of a current subframe and a configured multi-antenna scheme, and wherein the set is defined as a number of corresponding previous subframes to be reported in the current subframe.

27. The method of claim 26, wherein the previous subframes are part of a physical downlink shared channel.

28. The method of claim 21, wherein the first data transmission configuration information is a first time division duplex configuration information and the second data transmission configuration information is a second time division duplex configuration information.

29. The method of claim 21, wherein the control message is a system information block message, and wherein the second data transmission configuration information is included in an explicit signaling.

30. A node operable to communicate with a plurality of mobile devices and operable in a cell in a communication network, the node comprising:
a processor;
a memory coupled to the processor;
a network interface coupled to the processor; and
a transceiver coupled to the network interface,
wherein the processor is configured to:
transmit, to a mobile device included in the plurality of mobile devices, a control message comprising a first data transmission configuration information,
transmit, to the mobile device, a second data transmission configuration information at a predetermined transmission timing, and
receive data, from the mobile device, in accordance with a third data transmission configuration determined from a set of configurations, wherein the third data transmission configuration is determined, such that, if the mobile device received the second data transmission configuration information at the predetermined transmission timing, then the set of configurations is associated with the second data transmission configuration information, otherwise the set of configurations is associated with the first data transmission configuration information.

31. The node according to claim 30, wherein the third data transmission configuration is a downlink hybrid automatic repeat request reference configuration.

32. The node according to claim 31, wherein the downlink hybrid automatic repeat request reference configuration is the same for all dynamic time division duplex capable mobile devices of the plurality of mobile devices.

33. The node according to claim 30, wherein the data comprises hybrid automatic repeat request feedback.

34. The node of claim 33, wherein the hybrid automatic repeat request feedback is received using physical uplink control channel format 3.

35. The node according to claim 30, wherein the data has a payload size based on a size of a set of a current subframe and a configured multi-antenna scheme, and wherein the set is defined as a number of corresponding previous subframes to be reported in the current subframe.

36. The node according to claim 35, wherein the previous subframes are part of a physical downlink shared channel.

37. The node according to claim 30, wherein the first data transmission configuration information is a first time division duplex configuration information and the second data transmission configuration information is a second time division duplex configuration information.

38. The node according to claim 30, wherein the control message is a system information block message, and wherein the second data transmission configuration information is included in an explicit signaling.

* * * * *